US008786639B2

(12) United States Patent
McCullough et al.

(10) Patent No.: US 8,786,639 B2
(45) Date of Patent: Jul. 22, 2014

(54) DEVICE, METHOD, AND GRAPHICAL USER INTERFACE FOR MANIPULATING A COLLECTION OF OBJECTS

(75) Inventors: Ian Patrick McCullough, Wilkinsburg, PA (US); Peter Glen Berger, Irwin, PA (US)

(73) Assignee: Apple Inc., Cupertino, CA (US)

(*) Notice: Subject to any disclaimer, the term of this patent is extended or adjusted under 35 U.S.C. 154(b) by 893 days.

(21) Appl. No.: 12/789,422

(22) Filed: May 27, 2010

(65) Prior Publication Data

US 2011/0164055 A1 Jul. 7, 2011

Related U.S. Application Data

(60) Provisional application No. 61/292,800, filed on Jan. 6, 2010.

(51) Int. Cl.
*G09G 5/30* (2006.01)

(52) U.S. Cl.
USPC .......................................................... 345/676

(58) Field of Classification Search
USPC .......................................................... 345/676
See application file for complete search history.

(56) References Cited

U.S. PATENT DOCUMENTS

| 5,754,873 | A  | * | 5/1998 | Nolan | 715/235 |
|---|---|---|---|---|---|
| 7,075,512 | B1 | * | 7/2006 | Fabre et al. | 345/156 |
| 8,239,784 | B2 | * | 8/2012 | Hotelling et al. | 715/830 |
| 2003/0199293 | A1 | * | 10/2003 | Skripachev et al. | 463/9 |
| 2003/0218619 | A1 | * | 11/2003 | Ben-Tovim | 345/649 |
| 2006/0125803 | A1 | * | 6/2006 | Westerman et al. | 345/173 |
| 2007/0028142 | A1 | * | 2/2007 | Elsner et al. | 714/25 |
| 2009/0284479 | A1 | * | 11/2009 | Dennis et al. | 345/173 |
| 2009/0292989 | A1 | * | 11/2009 | Matthews et al. | 715/702 |
| 2009/0307589 | A1 | * | 12/2009 | Inose et al. | 715/702 |
| 2010/0083086 | A1 | * | 4/2010 | Berger et al. | 715/213 |
| 2010/0083091 | A1 | * | 4/2010 | Berger et al. | 715/220 |
| 2010/0083111 | A1 | * | 4/2010 | de Los Reyes | 715/702 |
| 2010/0083184 | A1 | * | 4/2010 | Trent et al. | 715/853 |
| 2010/0289752 | A1 | * | 11/2010 | Birkler | 345/173 |
| 2011/0050593 | A1 | * | 3/2011 | Kim et al. | 345/173 |
| 2011/0055729 | A1 | * | 3/2011 | Mason et al. | 715/753 |
| 2011/0069016 | A1 | * | 3/2011 | Victor | 345/173 |
| 2011/0141031 | A1 | * | 6/2011 | McCullough et al. | 345/173 |
| 2011/0141043 | A1 | * | 6/2011 | Soubrie | 345/173 |
| 2011/0164055 | A1 | * | 7/2011 | McCullough et al. | 345/642 |
| 2011/0167382 | A1 | * | 7/2011 | van Os | 715/800 |
| 2011/0196864 | A1 | * | 8/2011 | Mason et al. | 707/728 |
| 2011/0227947 | A1 | * | 9/2011 | Benko et al. | 345/650 |
| 2011/0252380 | A1 | * | 10/2011 | Chaudhri | 715/836 |
| 2011/0252381 | A1 | * | 10/2011 | Chaudhri | 715/838 |
| 2011/0302532 | A1 | * | 12/2011 | Missig | 715/823 |
| 2011/0310026 | A1 | * | 12/2011 | Davis et al. | 345/173 |
| 2012/0030569 | A1 | * | 2/2012 | Migos et al. | 715/702 |
| 2012/0221978 | A1 | * | 8/2012 | Matas et al. | 715/835 |

(Continued)

*Primary Examiner* — Javid A Amini

(74) *Attorney, Agent, or Firm* — Morrison & Foerster LLP

(57) ABSTRACT

A method includes: displaying a collection of objects; detecting a gesture made by a contact on the touch-sensitive surface, the gesture comprising a first movement of the contact on the touch-sensitive surface followed by a pause in movement of the contact followed by a second movement of the contact on the touch-sensitive surface; selecting a plurality of objects in the collection of objects in accordance with the first movement; and, after detecting the pause in movement of the contact, moving the selected plurality of objects away from unselected objects in the collection of objects in accordance with the second movement.

21 Claims, 27 Drawing Sheets

(56) References Cited

U.S. PATENT DOCUMENTS

| | | | |
|---|---|---|---|
| 2012/0254795 A1* | 10/2012 | Van Os et al. | 715/810 |
| 2012/0311508 A1* | 12/2012 | Fleizach | 715/863 |
| 2012/0327009 A1* | 12/2012 | Fleizach | 345/173 |
| 2013/0002539 A1* | 1/2013 | Dennard et al. | 345/156 |

* cited by examiner

US 8,786,639 B2

DEVICE, METHOD, AND GRAPHICAL USER INTERFACE FOR MANIPULATING A COLLECTION OF OBJECTS

RELATED APPLICATIONS

This application claims priority to U.S. Provisional Application Ser. No. 61/292,800, filed Jan. 6, 2010, entitled "Device, Method, and Graphical User Interface for Manipulating a Collection of Objects," which is incorporated herein by reference in its entirety.

TECHNICAL FIELD

This relates generally to electronic devices with touch-sensitive surfaces, including but not limited to electronic devices with touch-sensitive surfaces that receive gestural input for manipulating a collection of objects.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include manipulating a collection of user interface objects. In some applications, a user may want to manipulate multiple objects or portions of a chart. For example, a user may want to highlight certain wedges in a pie chart by grouping and separating them from the remainder of the wedges. A user may need to perform such manipulations on chart objects in a spreadsheet application (e.g., Numbers from Apple Inc. of Cupertino, Calif.), a presentation application (e.g., Keynote from Apple Inc. of Cupertino, Calif.), a word processing application (e.g., Pages from Apple Inc. of Cupertino, Calif.), a drawing application, or a website creation application (e.g., iWeb from Apple Inc. of Cupertino, Calif.).

But existing methods for manipulating a collection of objects (e.g., portions of a chart) are cumbersome and inefficient. For example, using a sequence of mouse-based inputs to select a collection of objects (e.g., chart portions) and manipulate the selected collection of objects (e.g., chart portions) is tedious and creates a significant cognitive burden on a user. In addition, existing methods take longer than necessary, thereby wasting energy. This latter consideration is particularly important in battery-operated devices.

SUMMARY

Accordingly, there is a need for computing devices with faster, more efficient methods and interfaces for manipulating a collection of objects (e.g., chart portions) by using touch-based gestural user input, such as sequential touch-based inputs on a track pad or touch screen. Such methods and interfaces may complement or replace conventional methods for manipulating a collection of objects (e.g., chart portions). Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices.

In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a display and a touch-sensitive surface. The method includes: displaying a chart with a plurality of chart portions; detecting a first contact at a first location on the touch-sensitive surface that corresponds to a location on the display of a first chart portion; and detecting a first movement of the first contact across the touch-sensitive surface to a second location that corresponds to a location on the display of a second chart portion that is distinct from the first chart portion. The first movement of the first contact touches respective locations on the touch-sensitive surface that correspond to locations on the display of respective chart portions, thereby selecting the respective chart portions. The method also includes: detecting a pause in movement of the first contact at the second location; and, after detecting the pause in movement of the first contact at the second location: detecting a second movement of the first contact across the touch-sensitive surface to a third location and moving the selected chart portions away from the remainder of the chart in accordance with the second movement.

In accordance with some embodiments, a method is performed at a multifunction device with a display and a touch-sensitive surface. The method includes: displaying a collection of objects; and detecting a gesture made by a contact on the touch-sensitive surface. The gesture comprises a first movement of the contact on the touch-sensitive surface followed by a pause in movement of the contact followed by a second movement of the contact on the touch-sensitive surface. The method also includes: selecting a plurality of objects in the collection of objects in accordance with the first movement; and, after detecting the pause in movement of the contact, moving the selected plurality of objects away from unselected objects in the collection of objects in accordance with the second movement.

In accordance with some embodiments, a multifunction device includes a display, a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on a multifunction device with a display, a touch-sensitive surface, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by a multifunction device with a display and a touch-sensitive surface, cause the device to perform the operations of any of the methods described above. In accordance with some embodiments, a multifunction device includes: a display; a touch-sensitive surface; and means for performing the operations of any of the methods described above. In accordance with some embodiments, an information processing apparatus, for use in a multifunction device with a display and a touch-sensitive surface, includes means for performing the operations of any of the methods described above.

Thus, multifunction devices with displays and touch-sensitive surfaces are provided with faster, more efficient methods and interfaces for manipulating a collection of objects (e.g., chart portions) using touch-based gestural user input, thereby increasing the effectiveness, efficiency, and user satisfaction with such devices. Such methods and interfaces may complement or replace conventional methods for manipulating chart portions.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
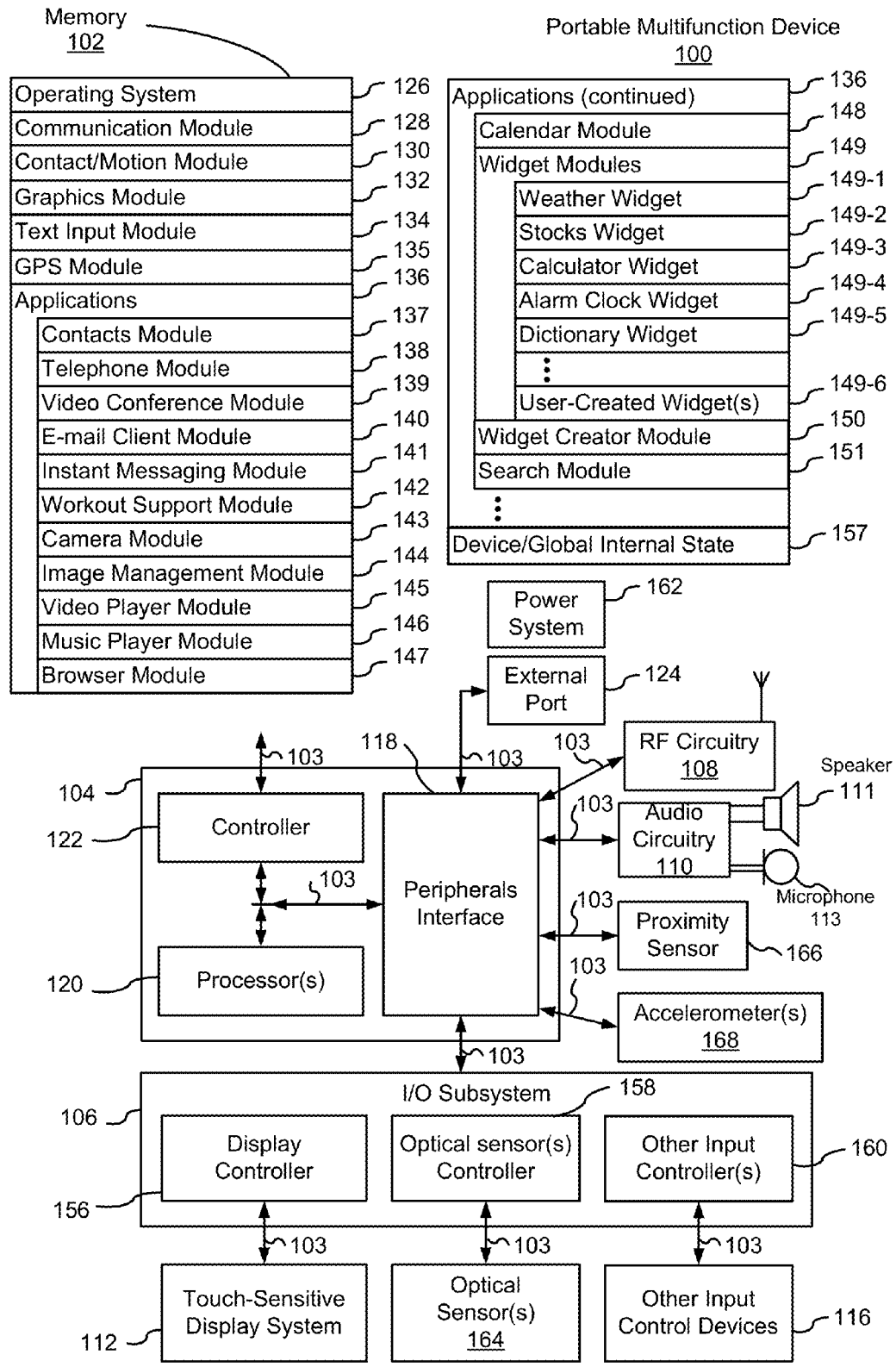
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected"may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone®and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices,"filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
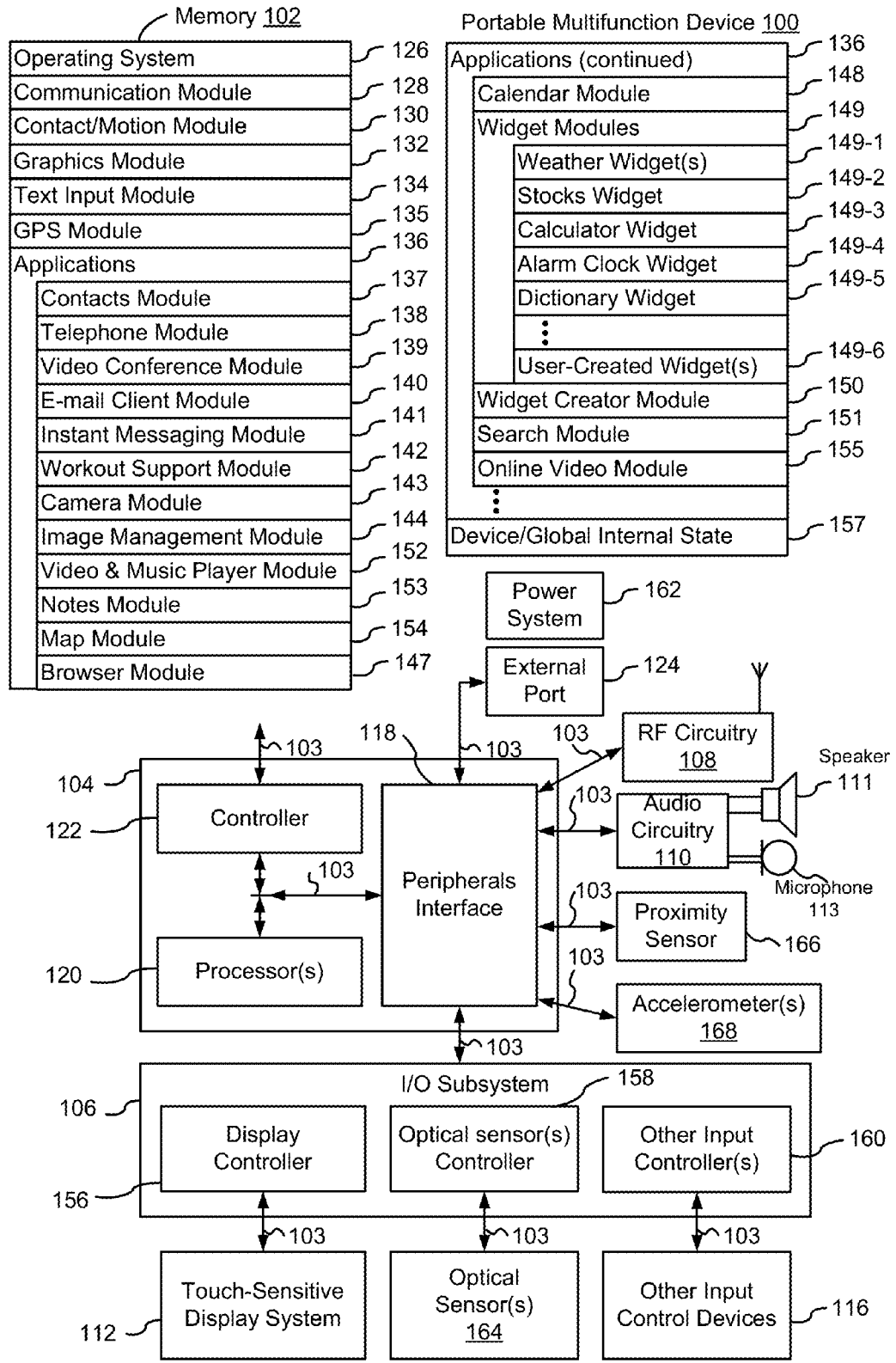

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch®from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a resolution in excess of 100 dpi. In some embodiments, the touch screen has a resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
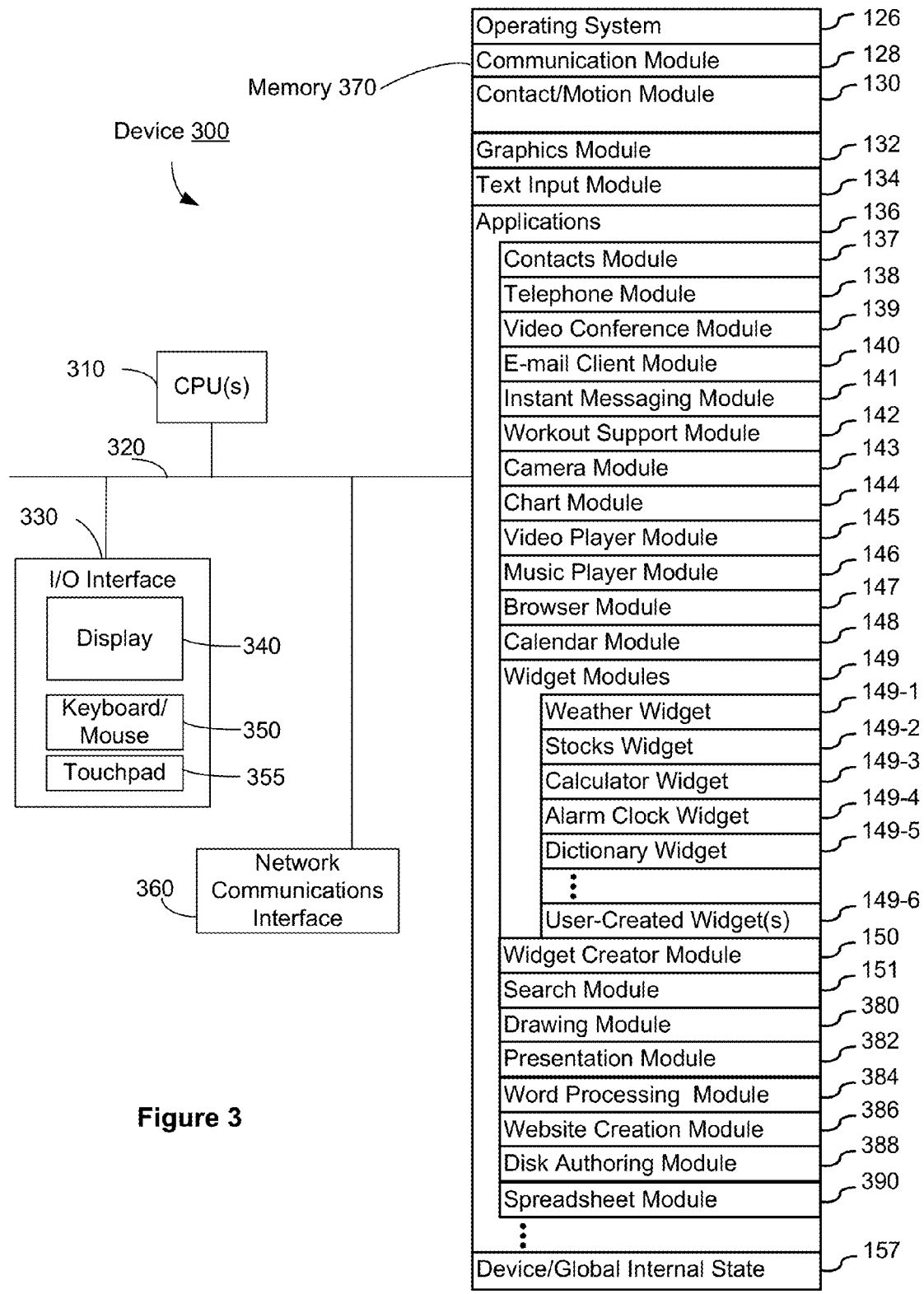
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module 145;
- music player module 146;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
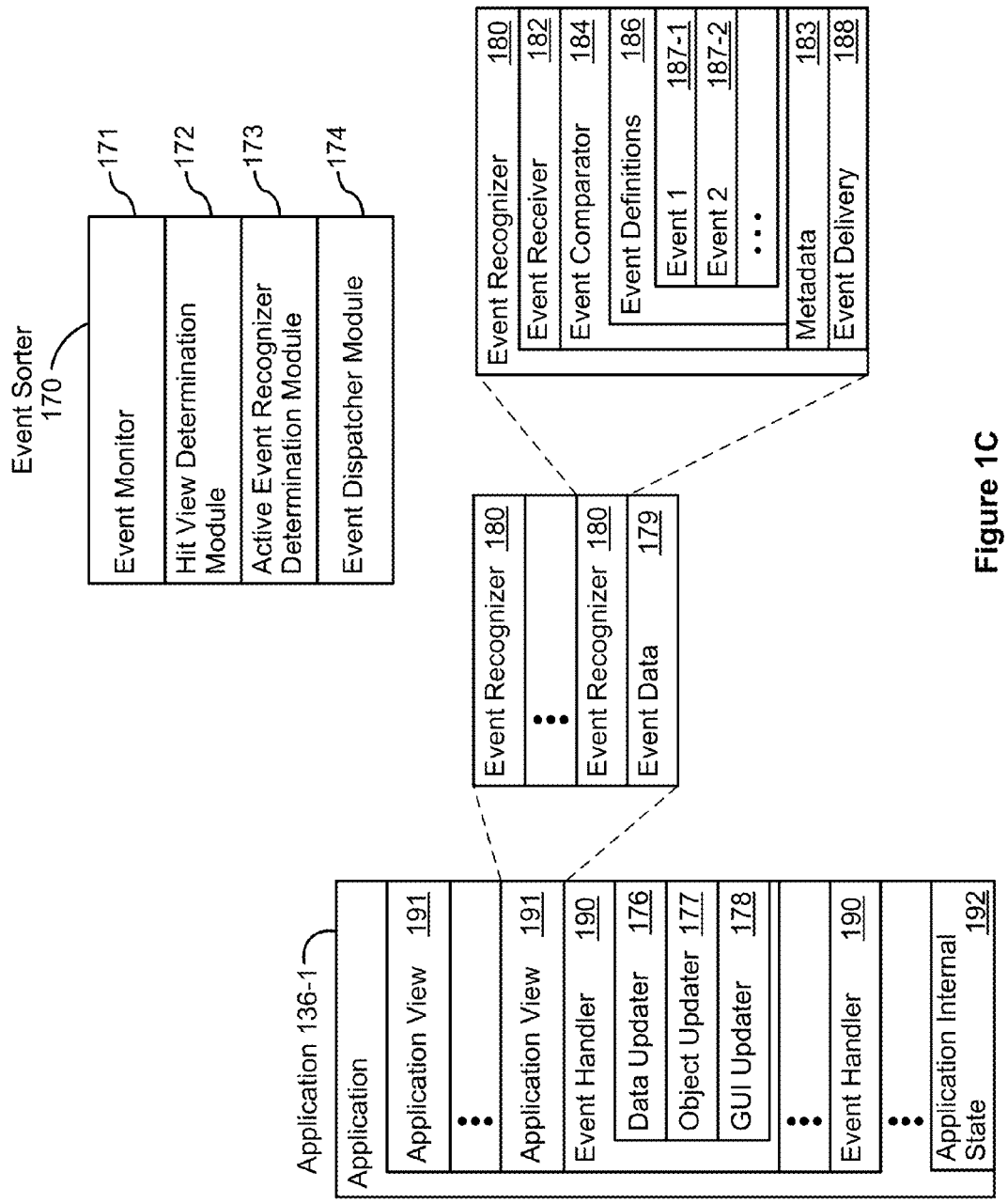
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
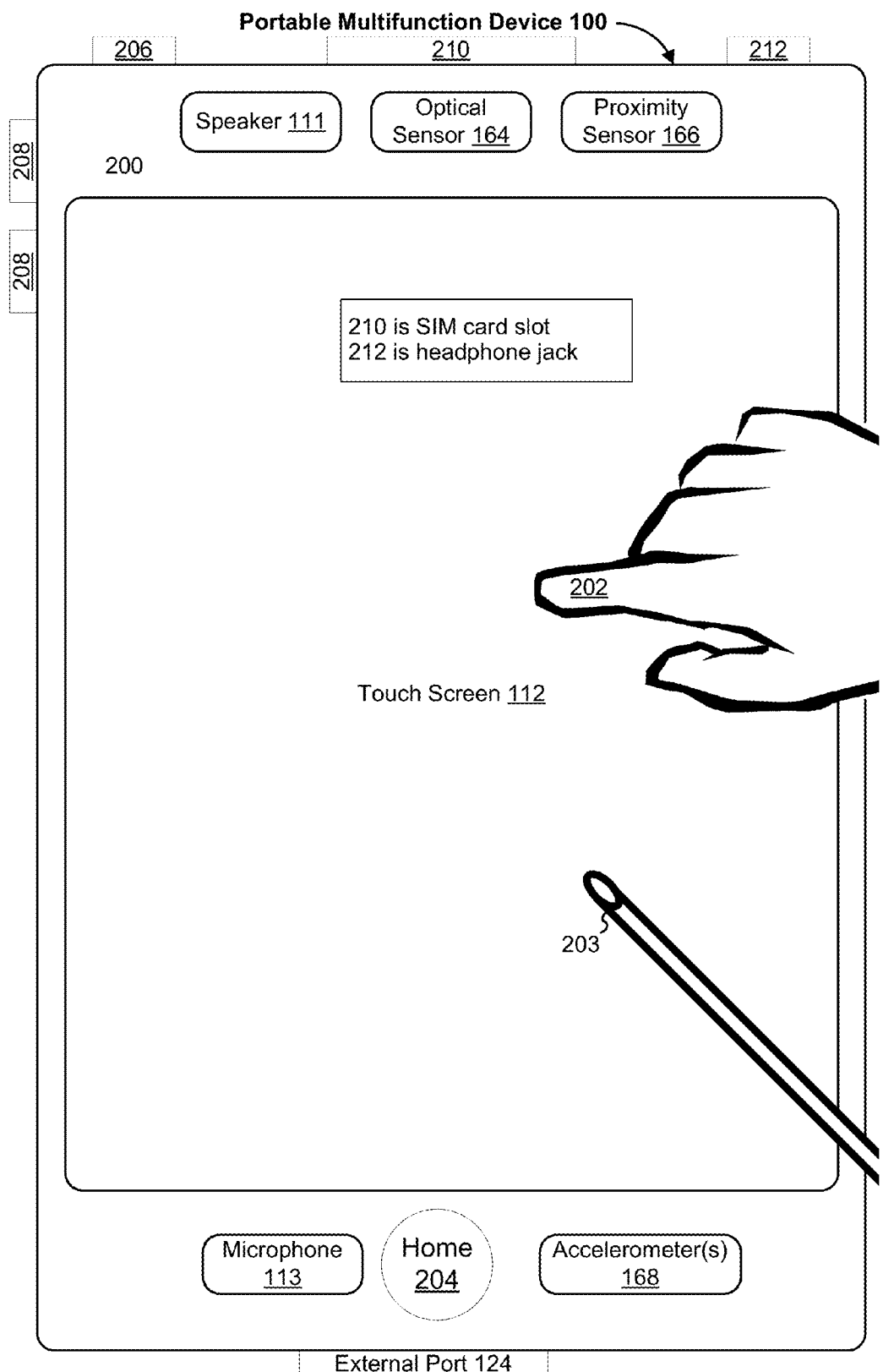
FIG. 2 illustrates a portable multifunction device having a touch-sensitive display in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
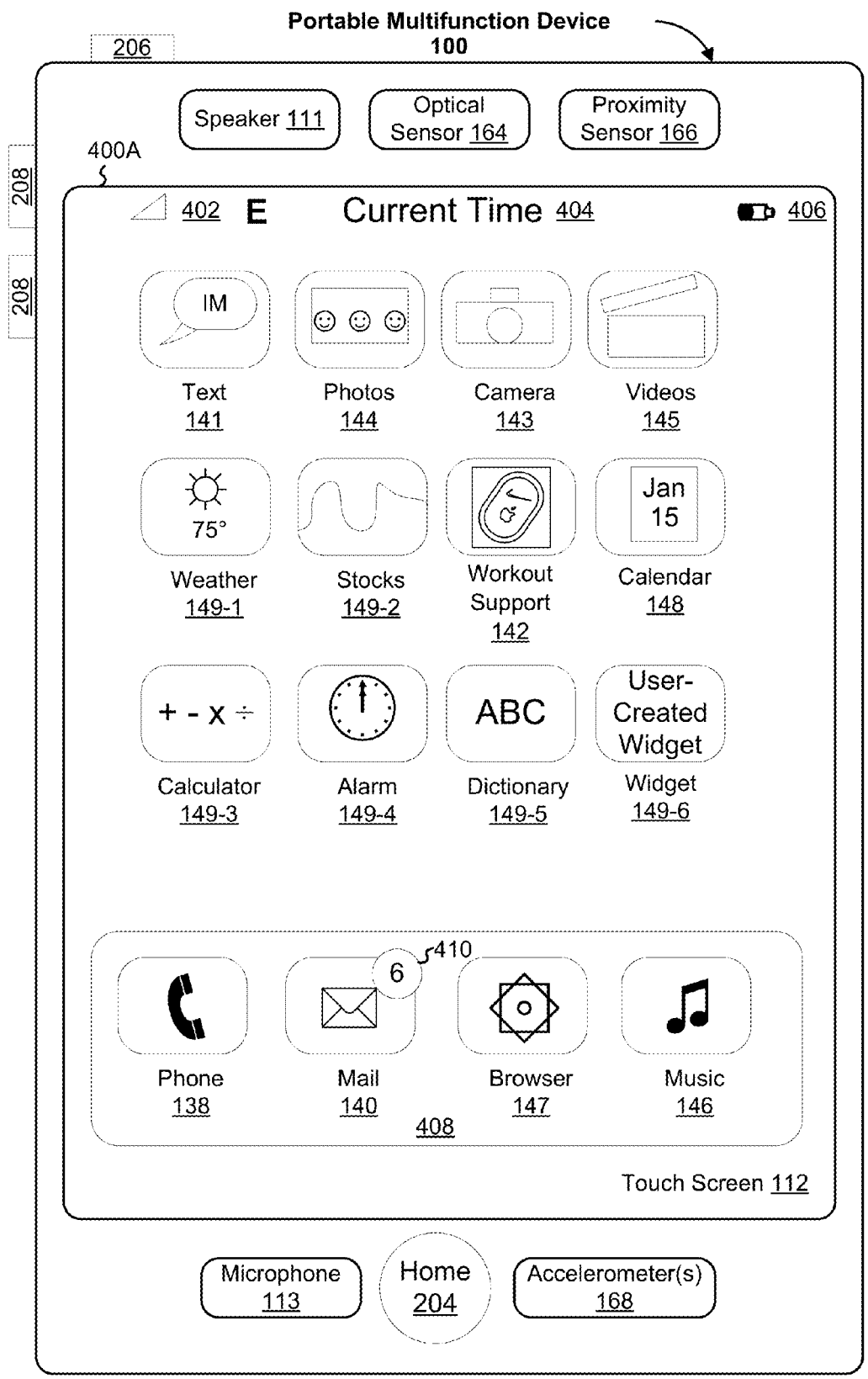
FIGS. 4A and 4B illustrate exemplary user interfaces for a menu of applications on a portable multifunction device in accordance with some embodiments.
Figure 4B:
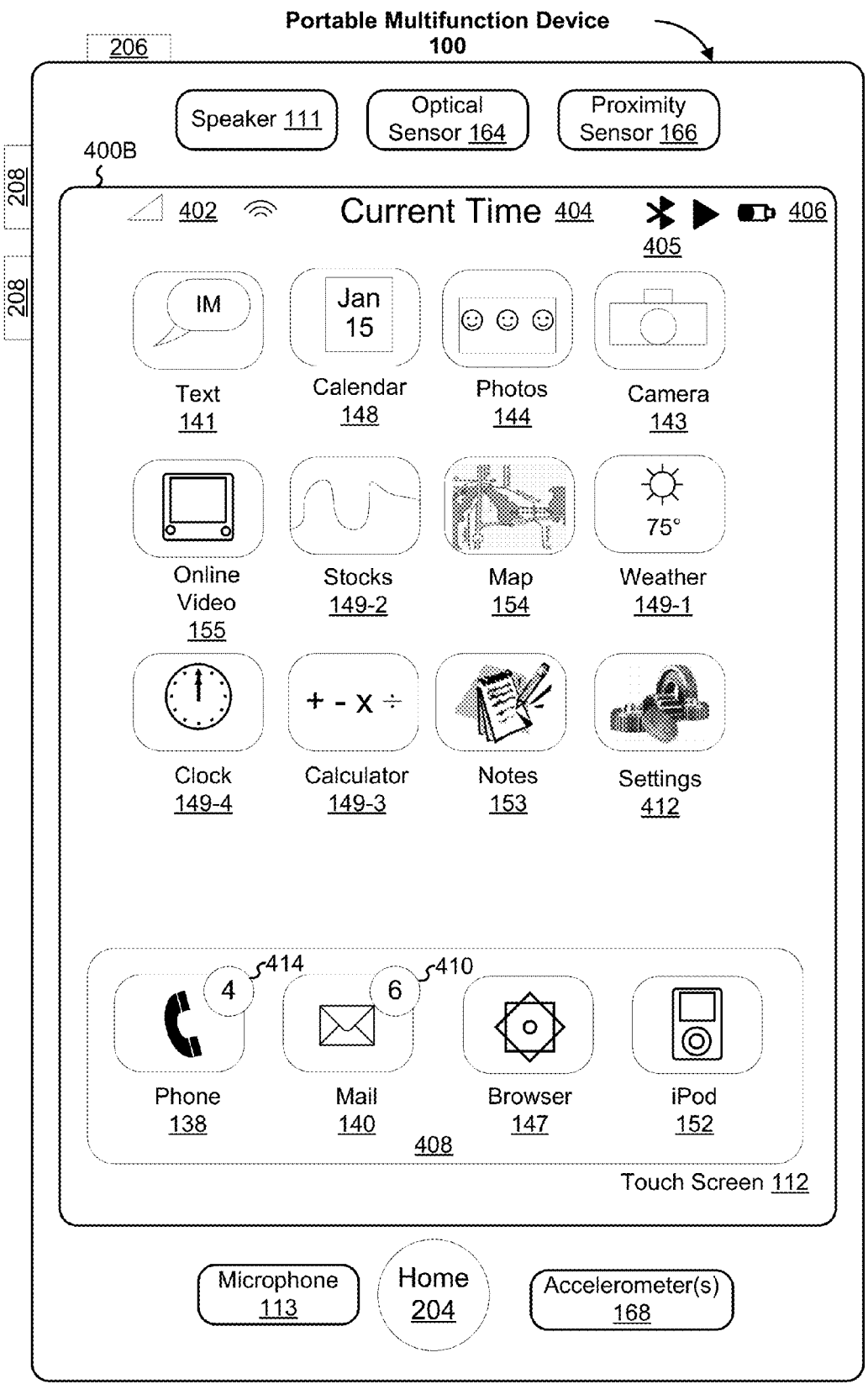

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
  402, 404, 405, 406, 141, 148, 144, 143, 149-3, 149-2, 149-1, 149-4, 410, 414, 138, 140, and 147, as described above;

Map 154;
Notes 153;
Settings 412, which provides access to settings for device 100 and its various applications 136, as described further below;
Video and music player module 152, also referred to as iPod (trademark of Apple Inc.) module 152; and
Online video module 155, also referred to as YouTube (trademark of Google Inc.) module 155.

Figure 4C:
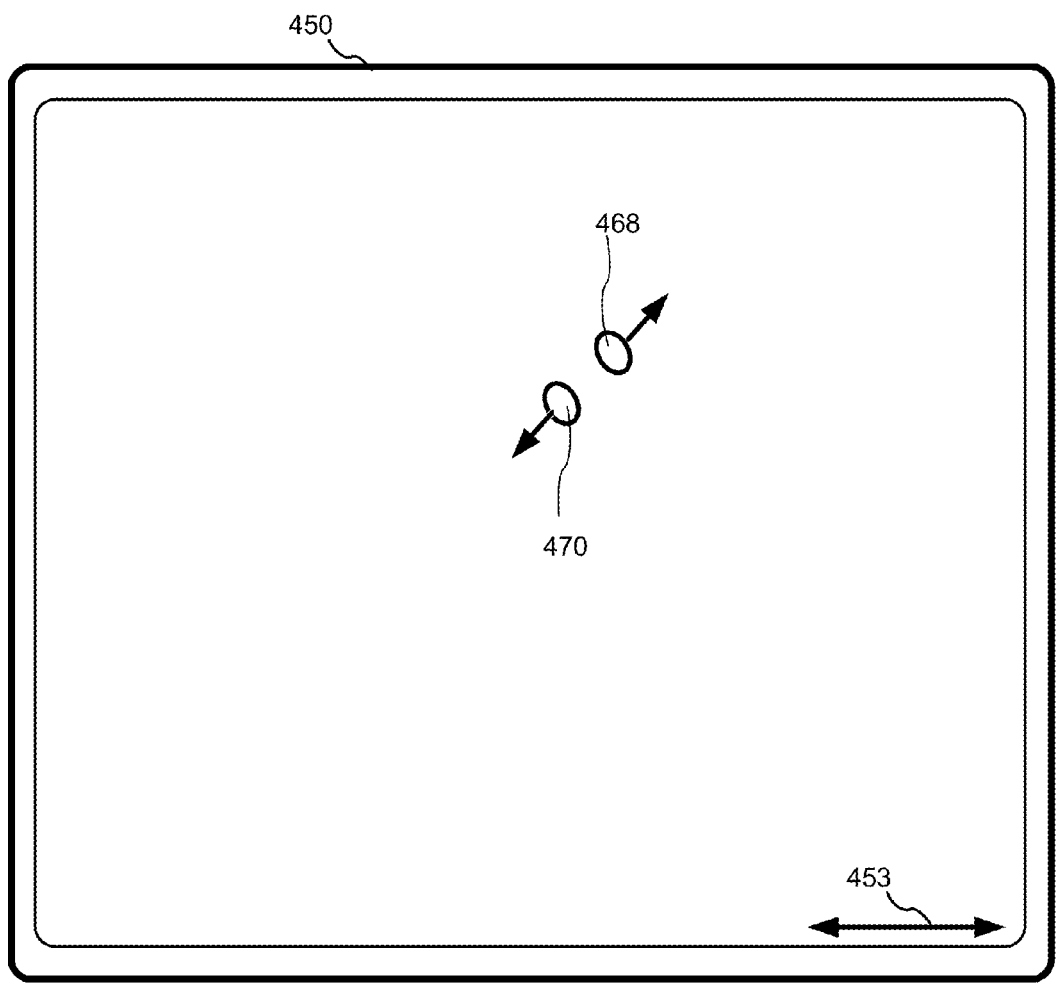
FIG. 4C illustrates an exemplary user interface for a multifunction device with a touch-sensitive surface that is separate from the display in accordance with some embodiments.
Figure 4C:
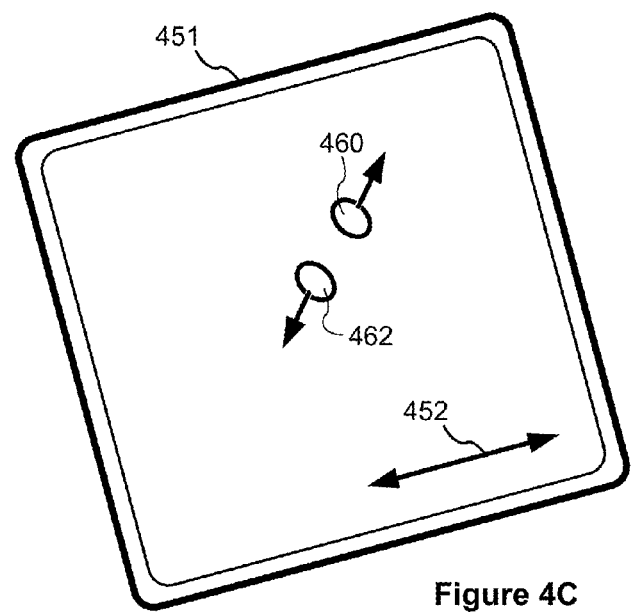

FIG. 4C illustrates an exemplary user interface on a device (e.g., device 300, FIG. 3) with touch-sensitive surface 451 (e.g., tablet or touchpad 355, FIG. 3) that is separate from display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a stylus input). In addition, in some embodiments, "touch gestures" include not only gestures, made by one or more fingers or one or more styluses, that make physical contact a touch-sensitive screen 112 or other touch-sensitive surface, but also gestures that occur, in whole or in part, sufficiently close to touch-sensitive screen 112 or other touch-sensitive surface that the one or more sensors of touch-sensitive screen 112 or other touch-sensitive surface are able to detect those gestures.

Attention is now directed towards embodiments of user interfaces ("UI") and associated processes that may be implemented on a multifunction device with a display and a touch-sensitive surface, such as device 300 or portable multifunction device 100.

Figure 5A:
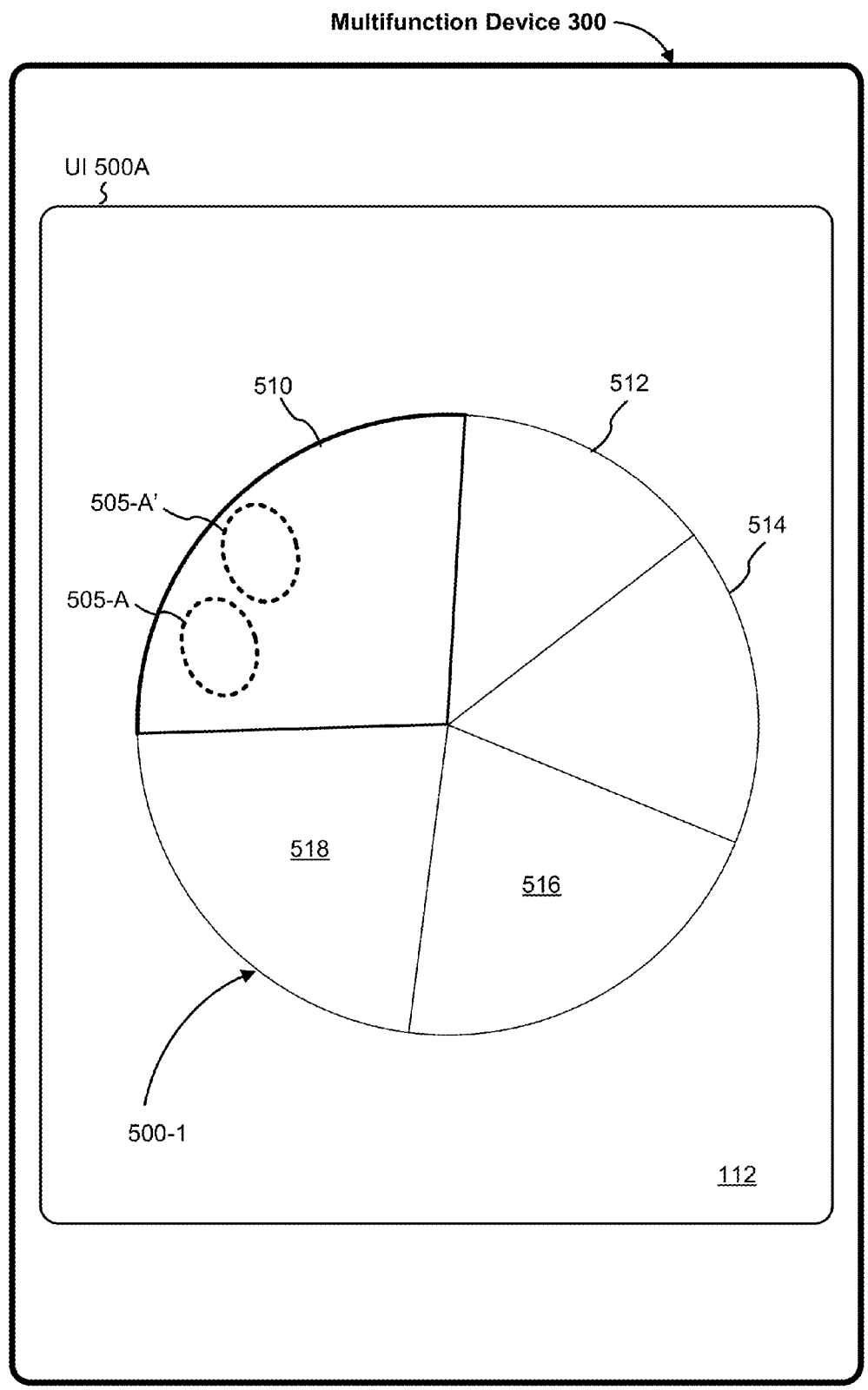
FIGS. 5A-5P illustrate exemplary user interfaces for manipulating chart portions in accordance with some embodiments.
Figure 5B:
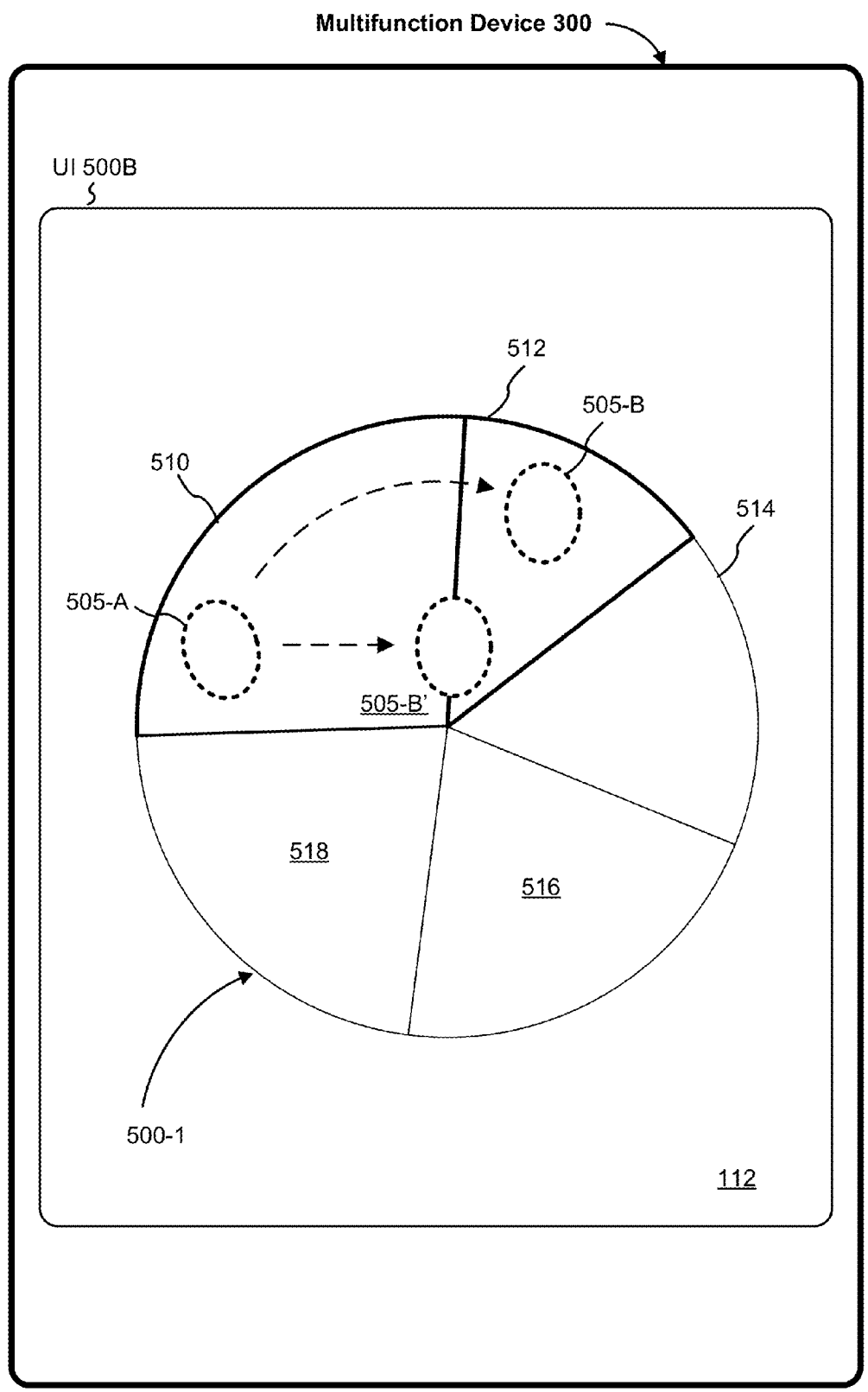
Figure 5C:
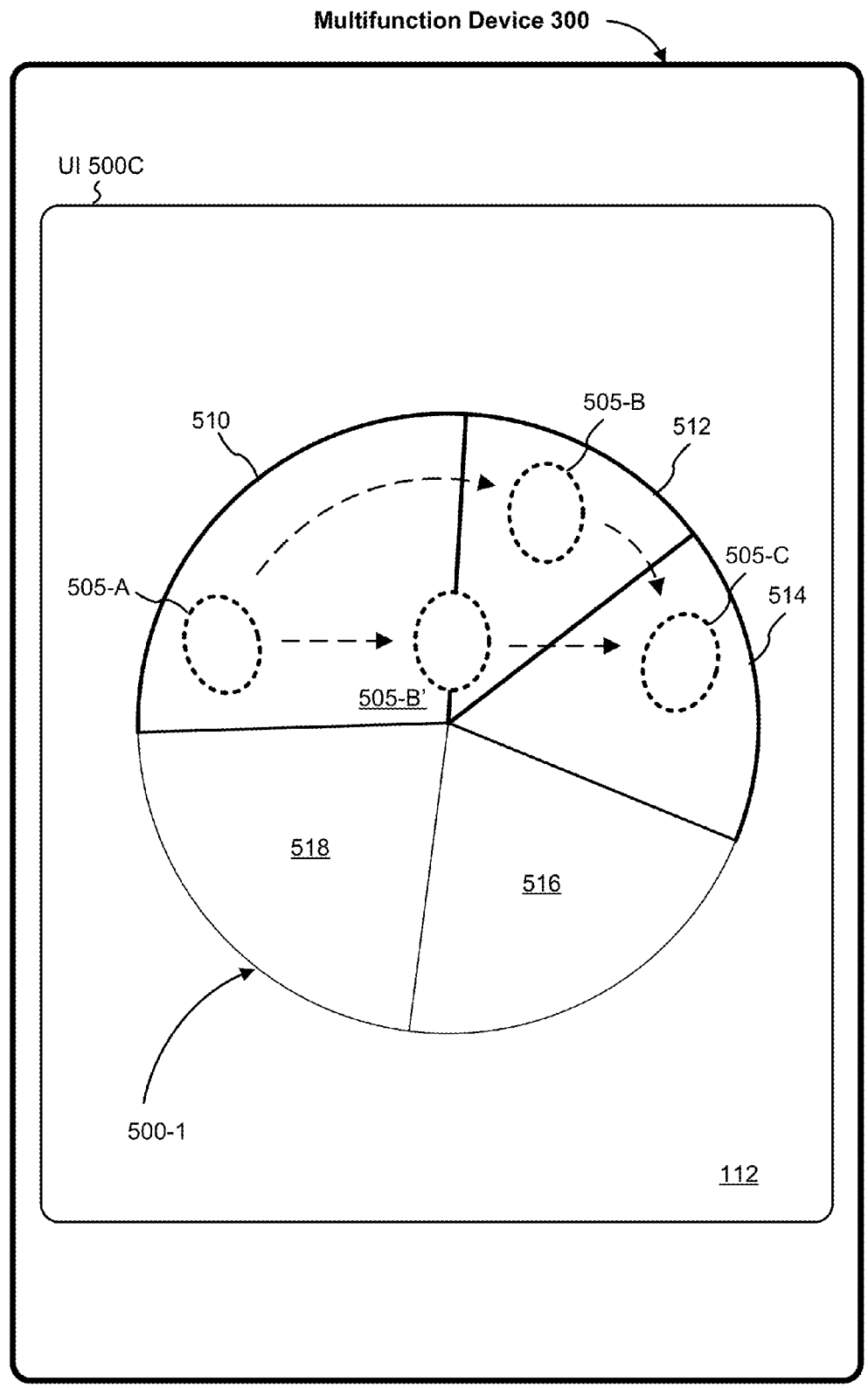
Figure 5D:
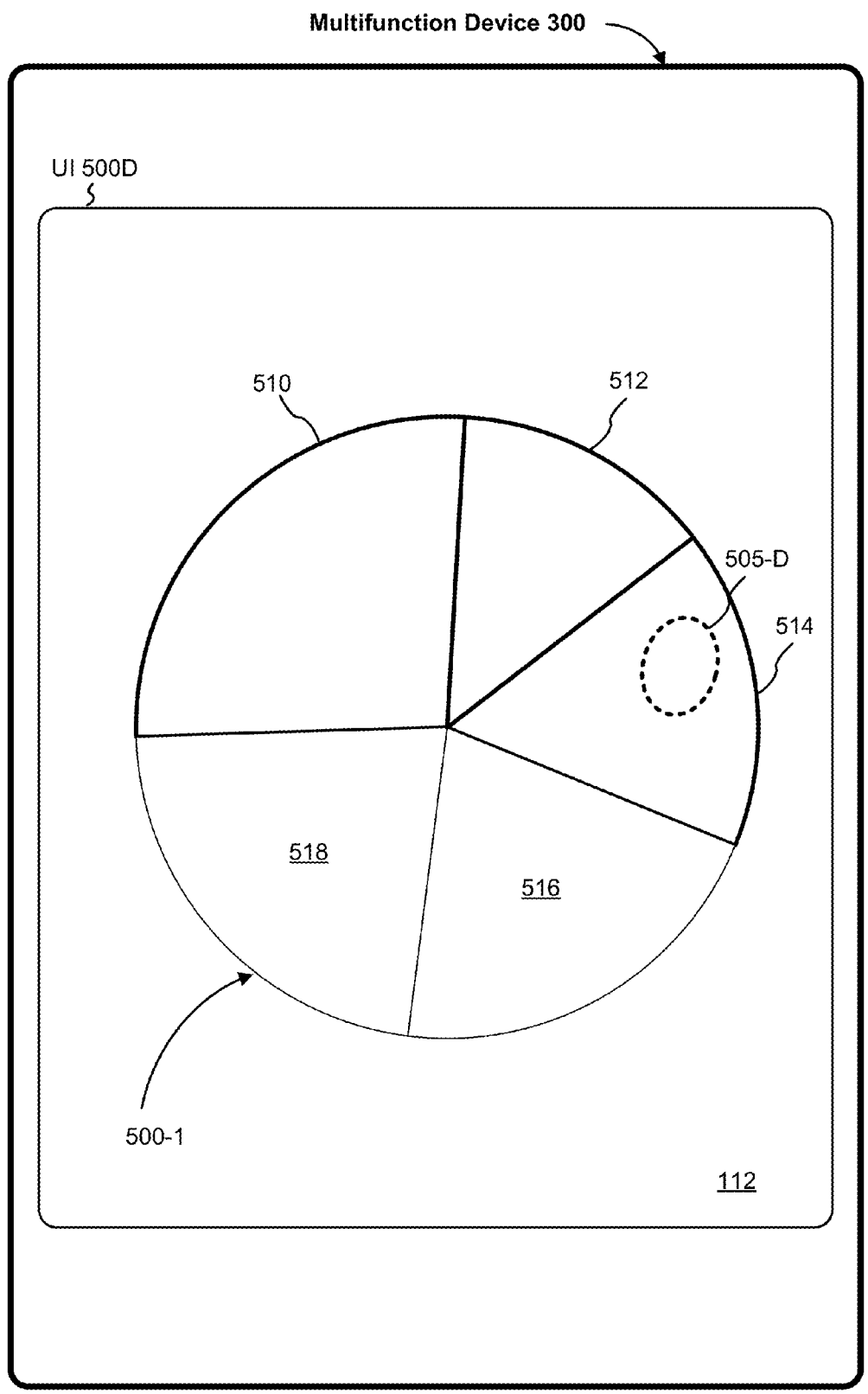
Figure 5E:
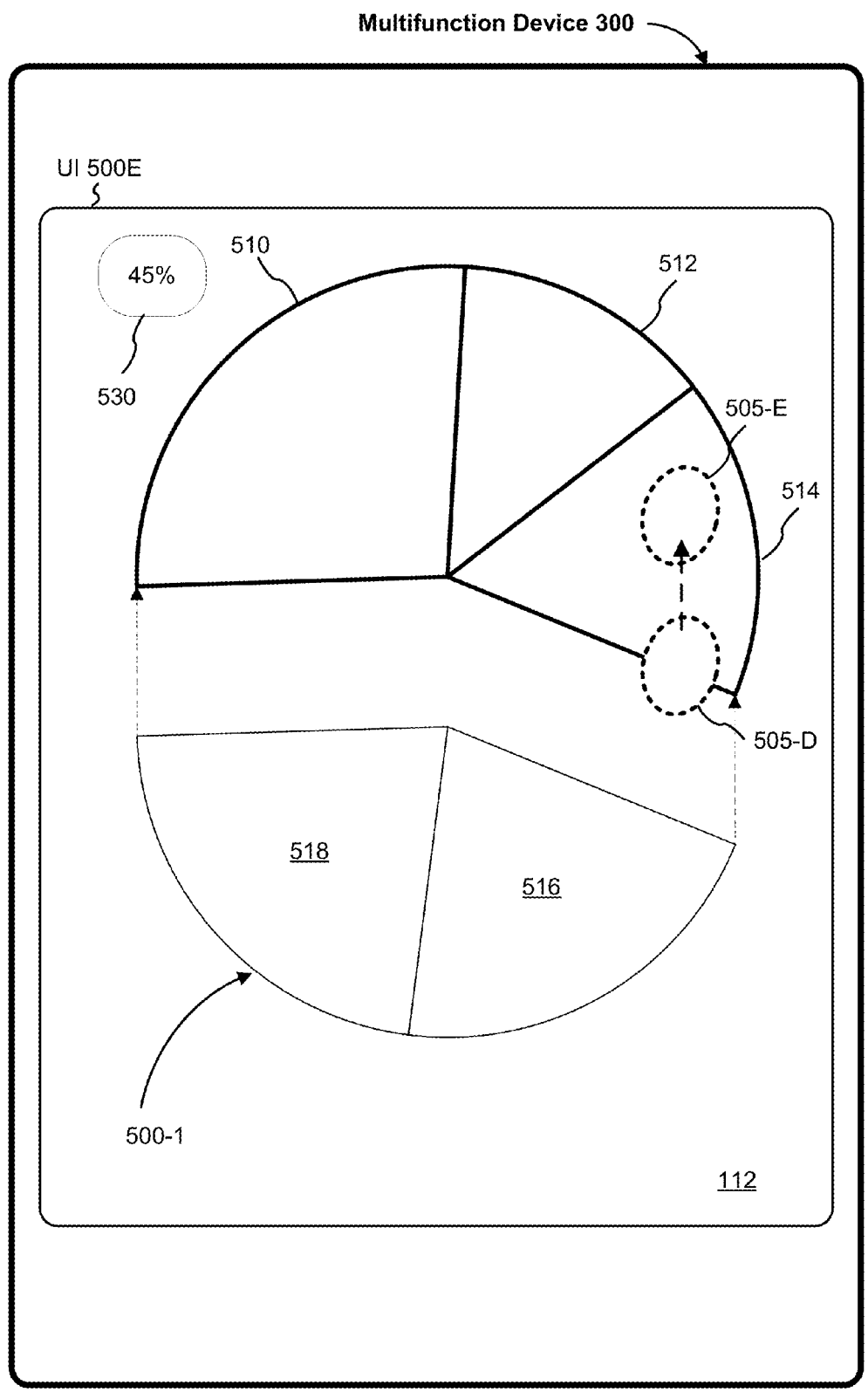
Figure 5F:
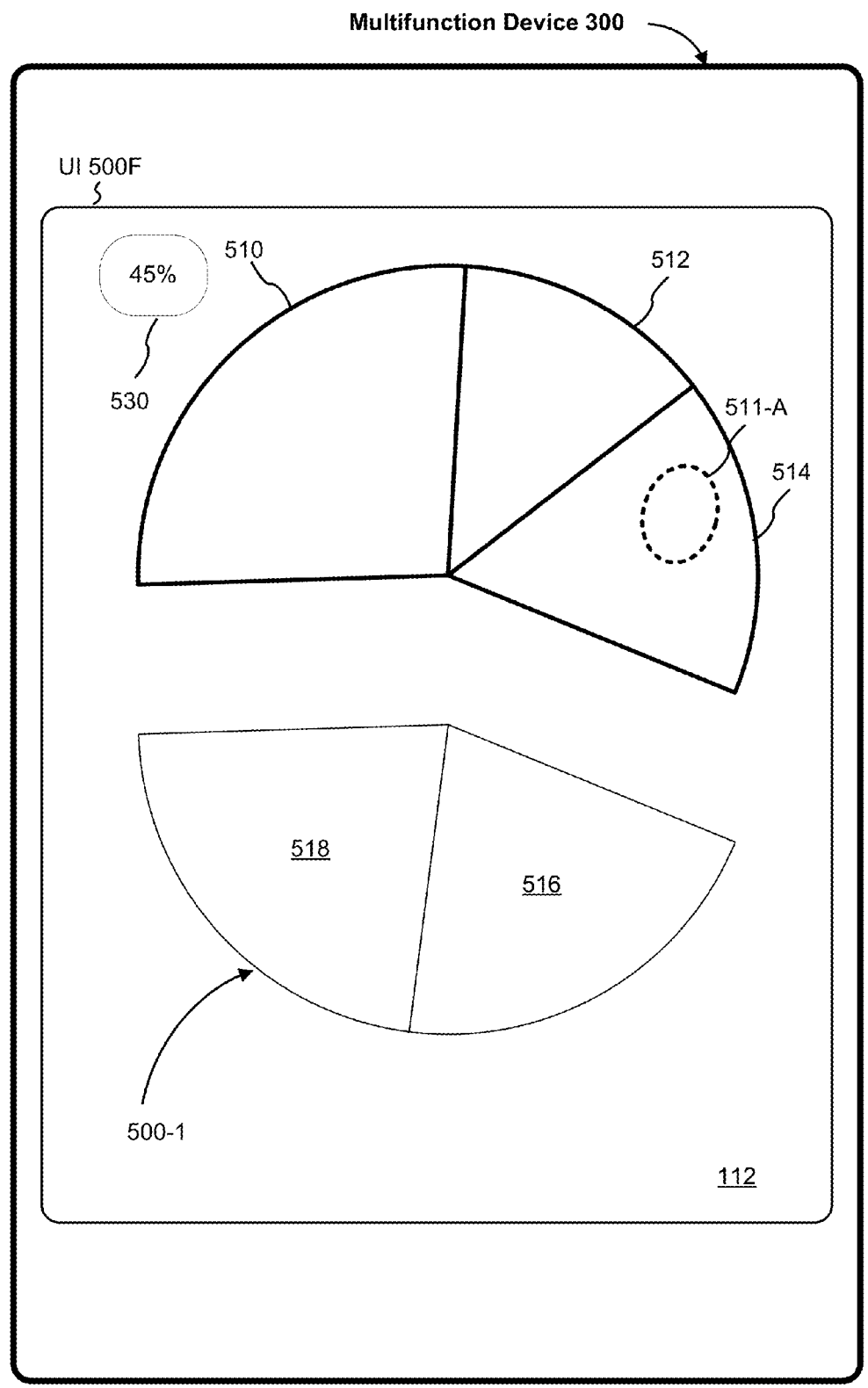
Figure 5G:
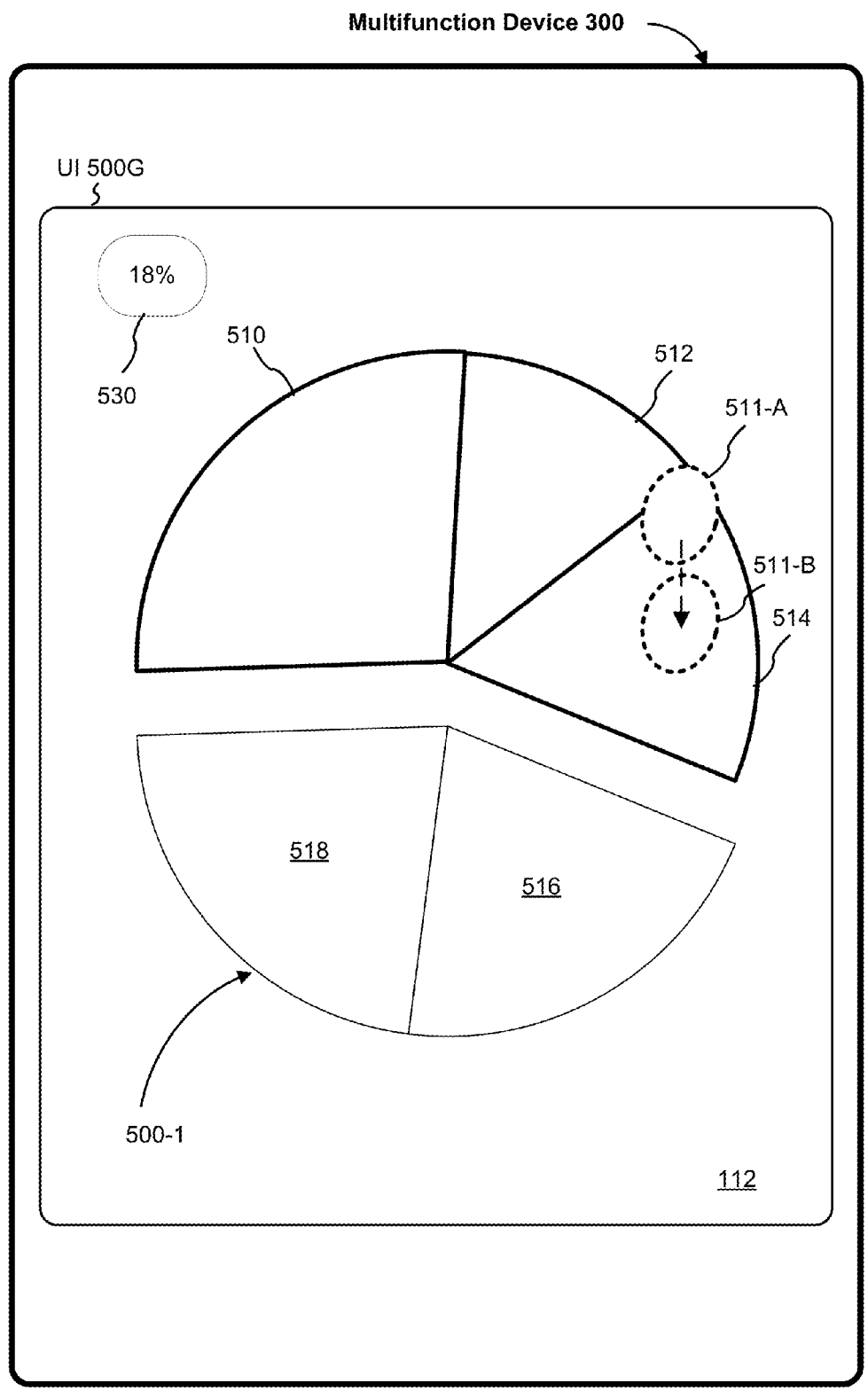
Figure 5H:
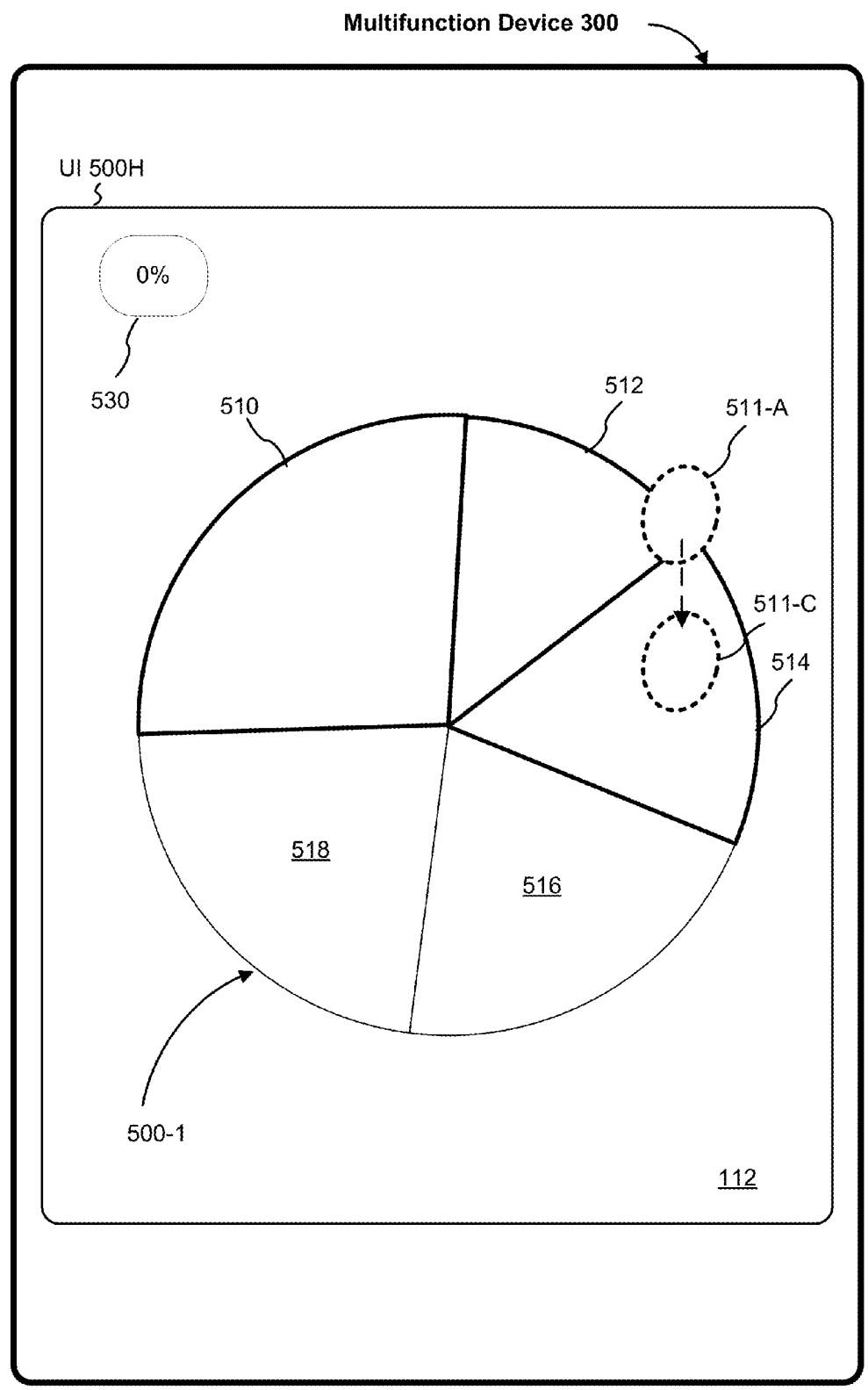
Figure 5I:
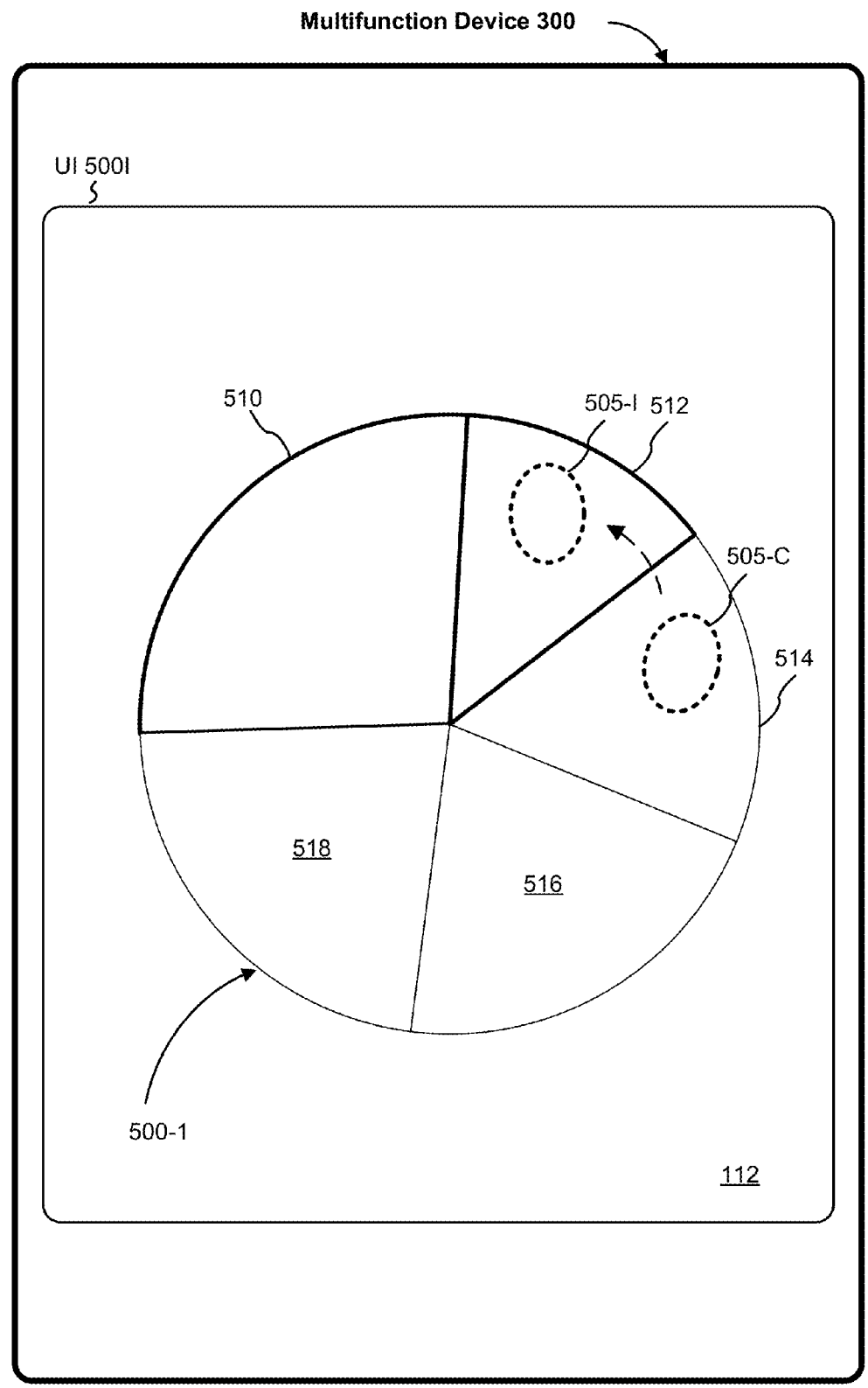
Figure 5J:
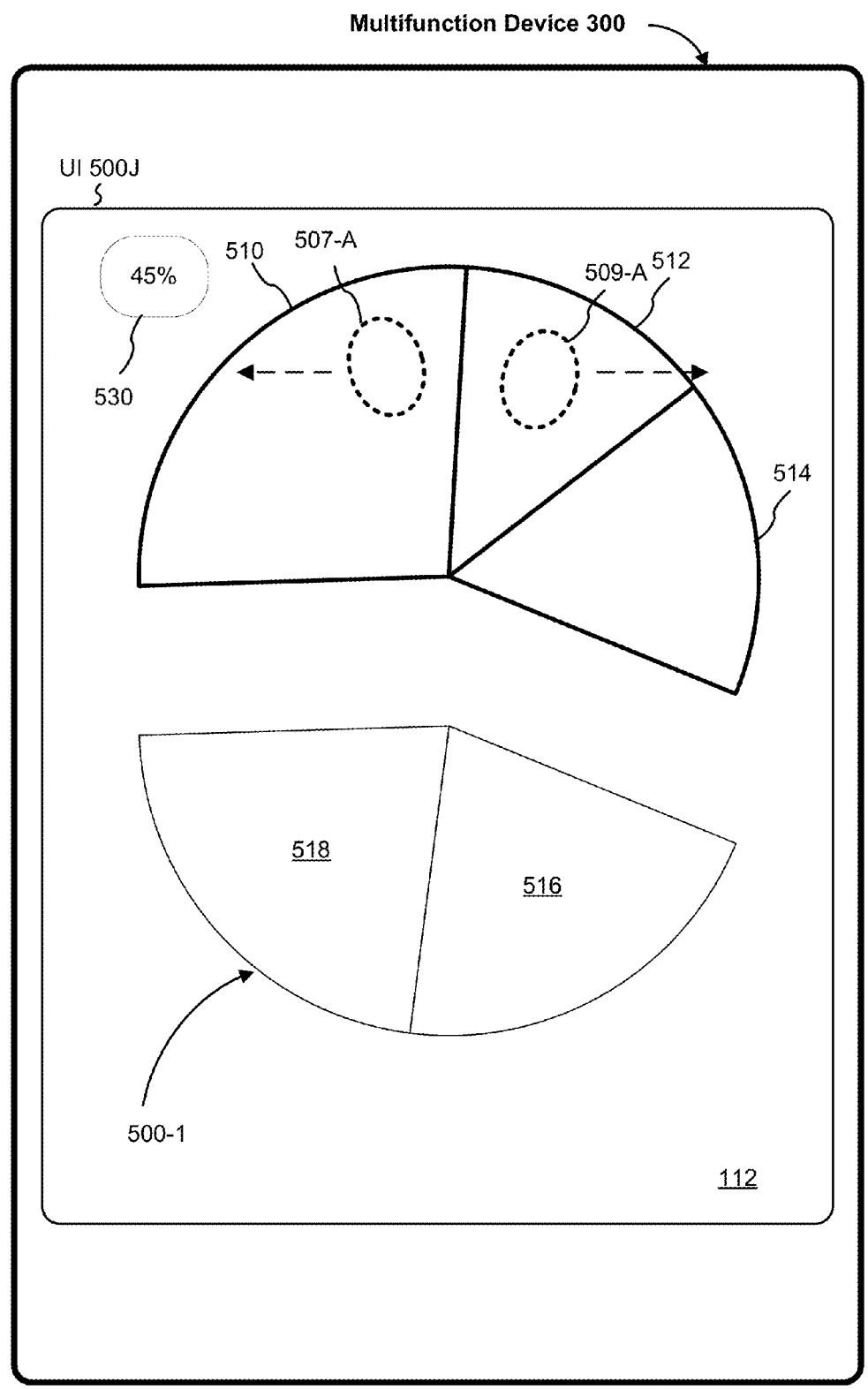
Figure 5K:
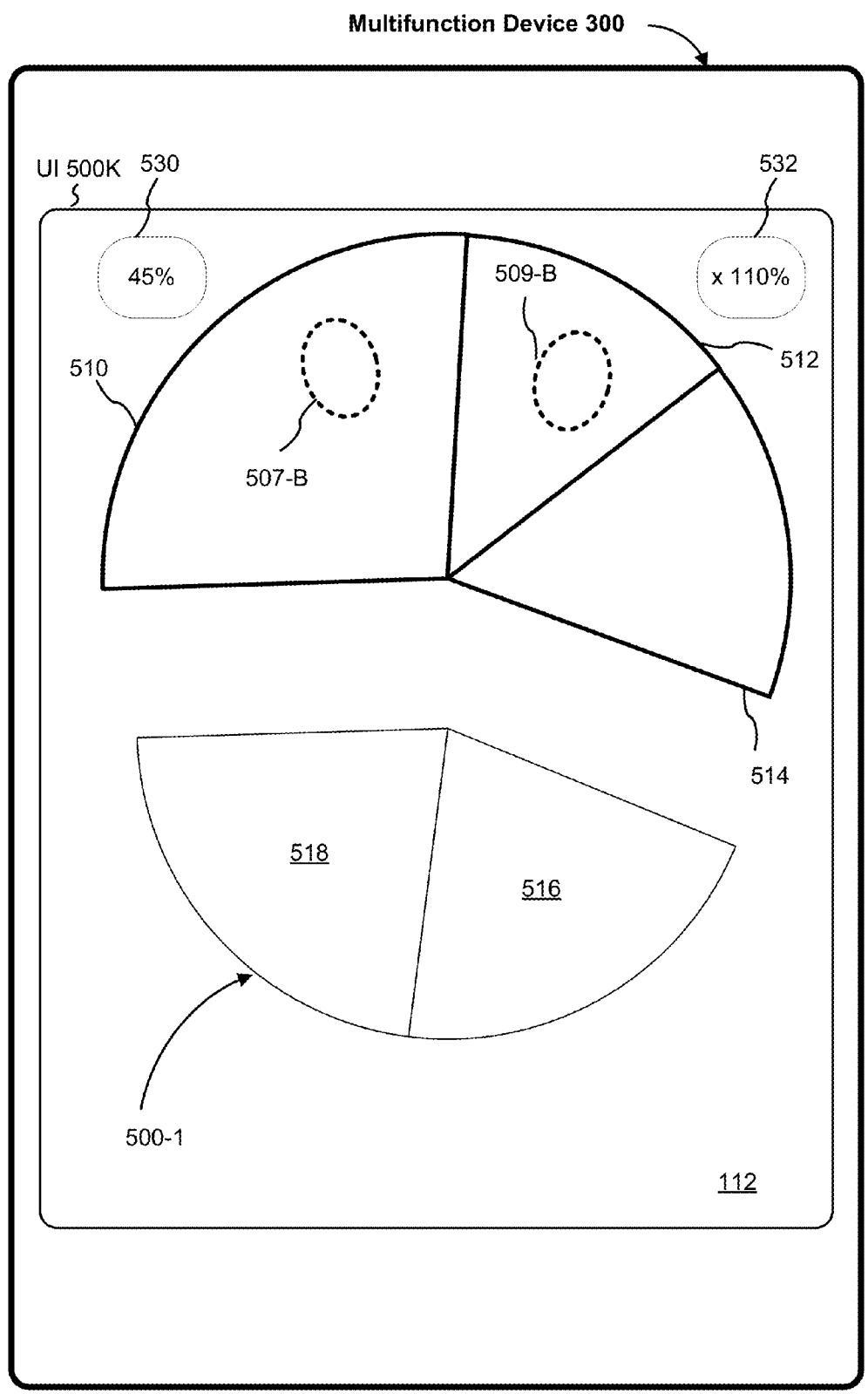
Figure 5L:
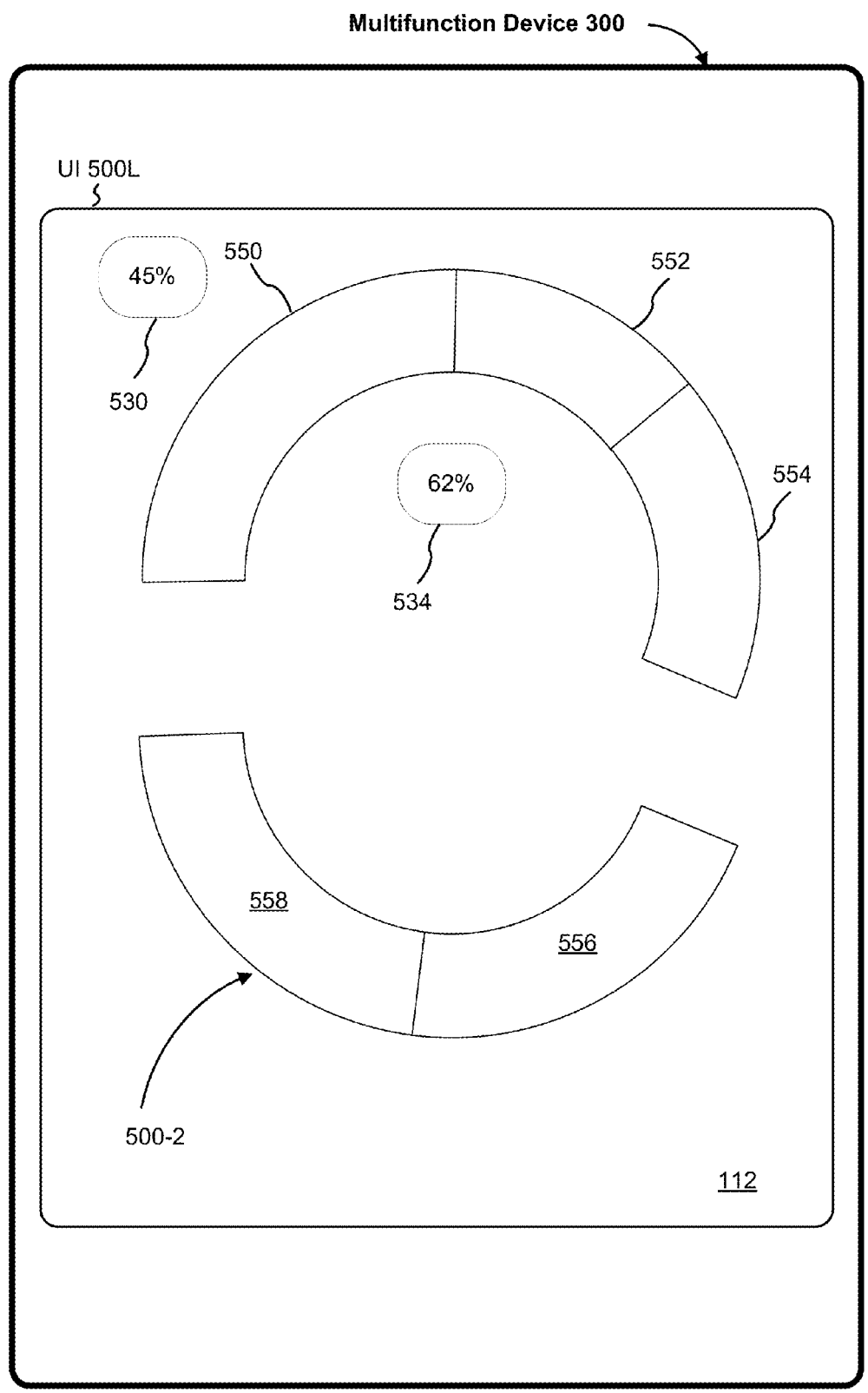
Figure 5M:
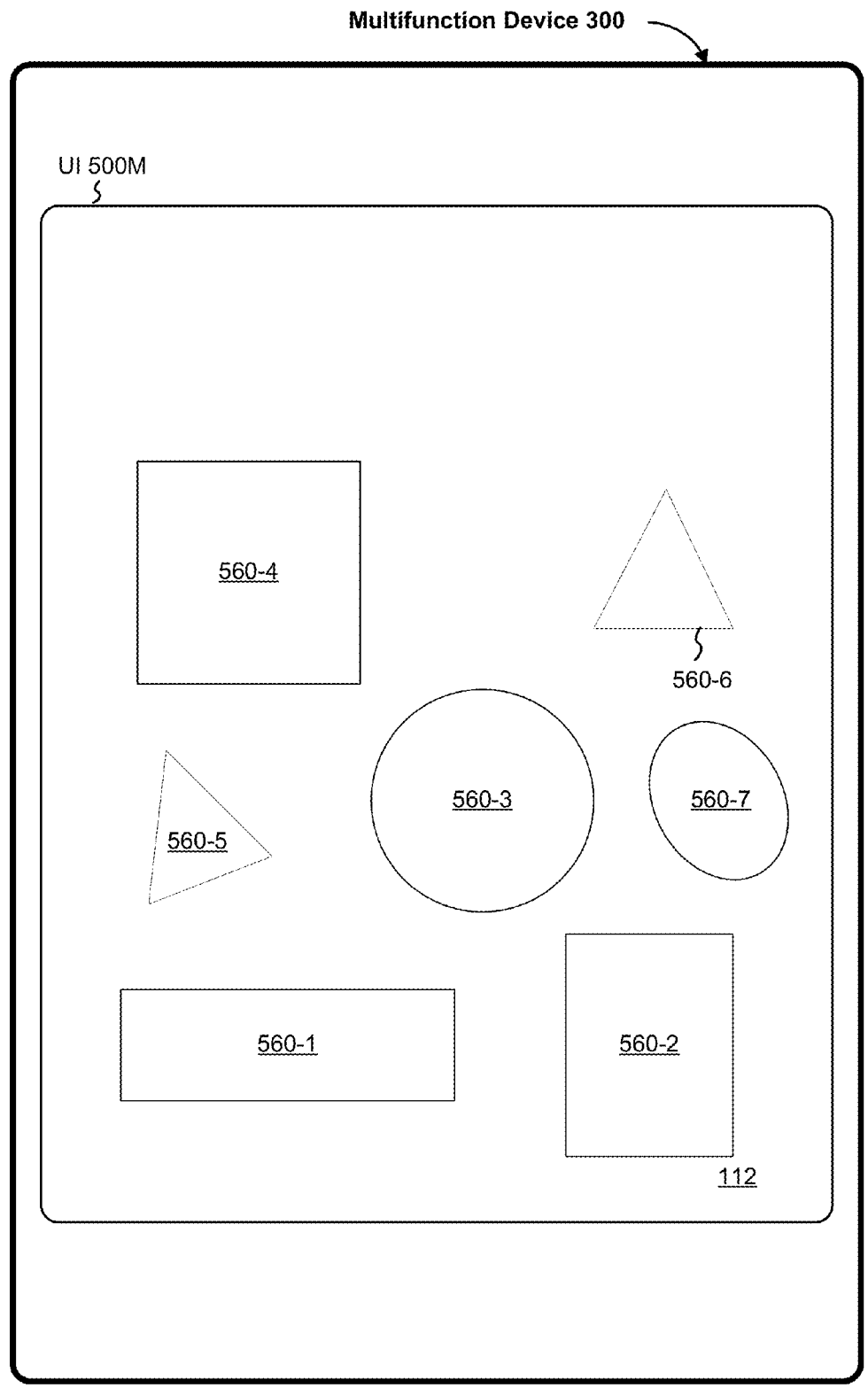
Figure 5N:
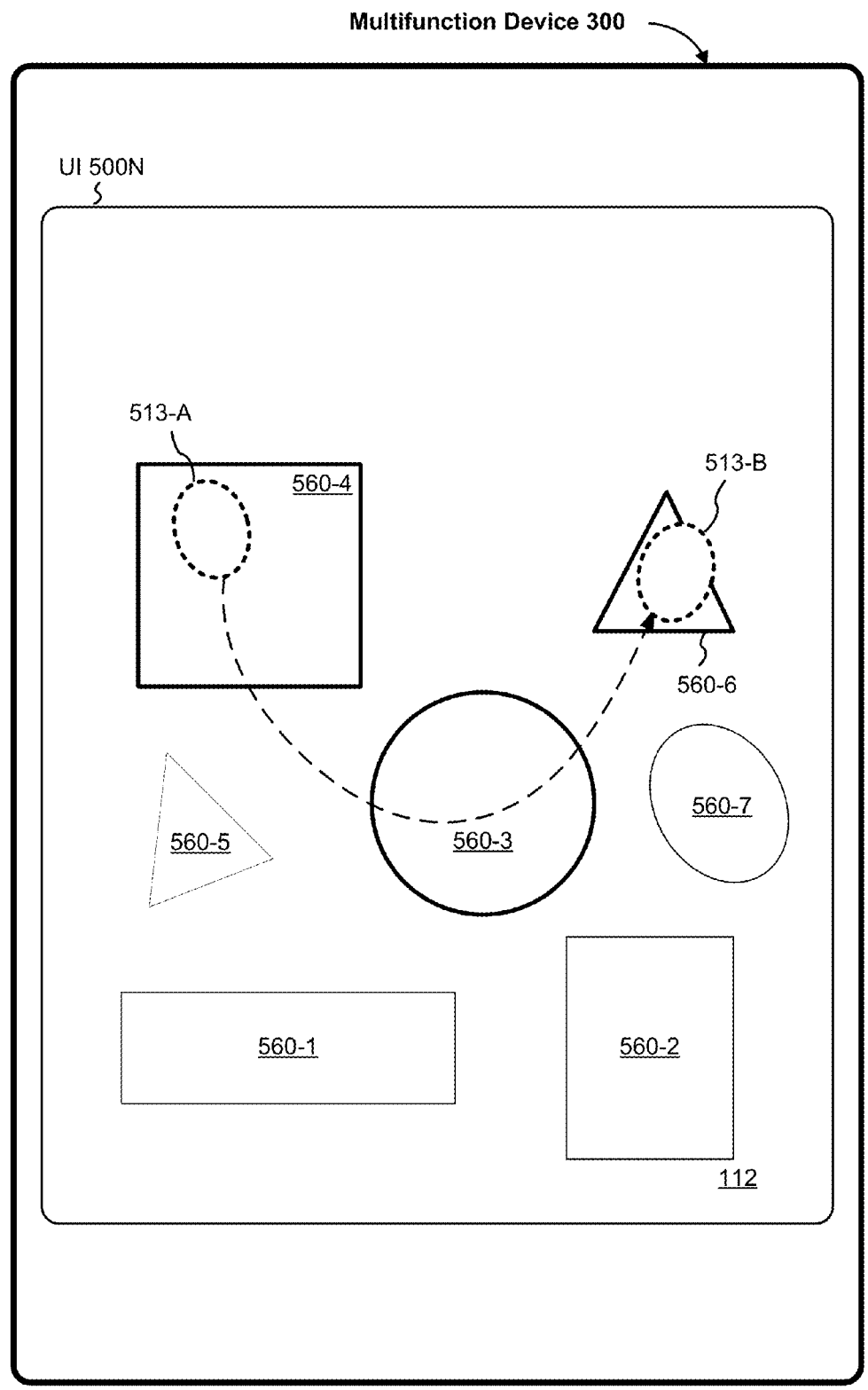
Figure 5O:
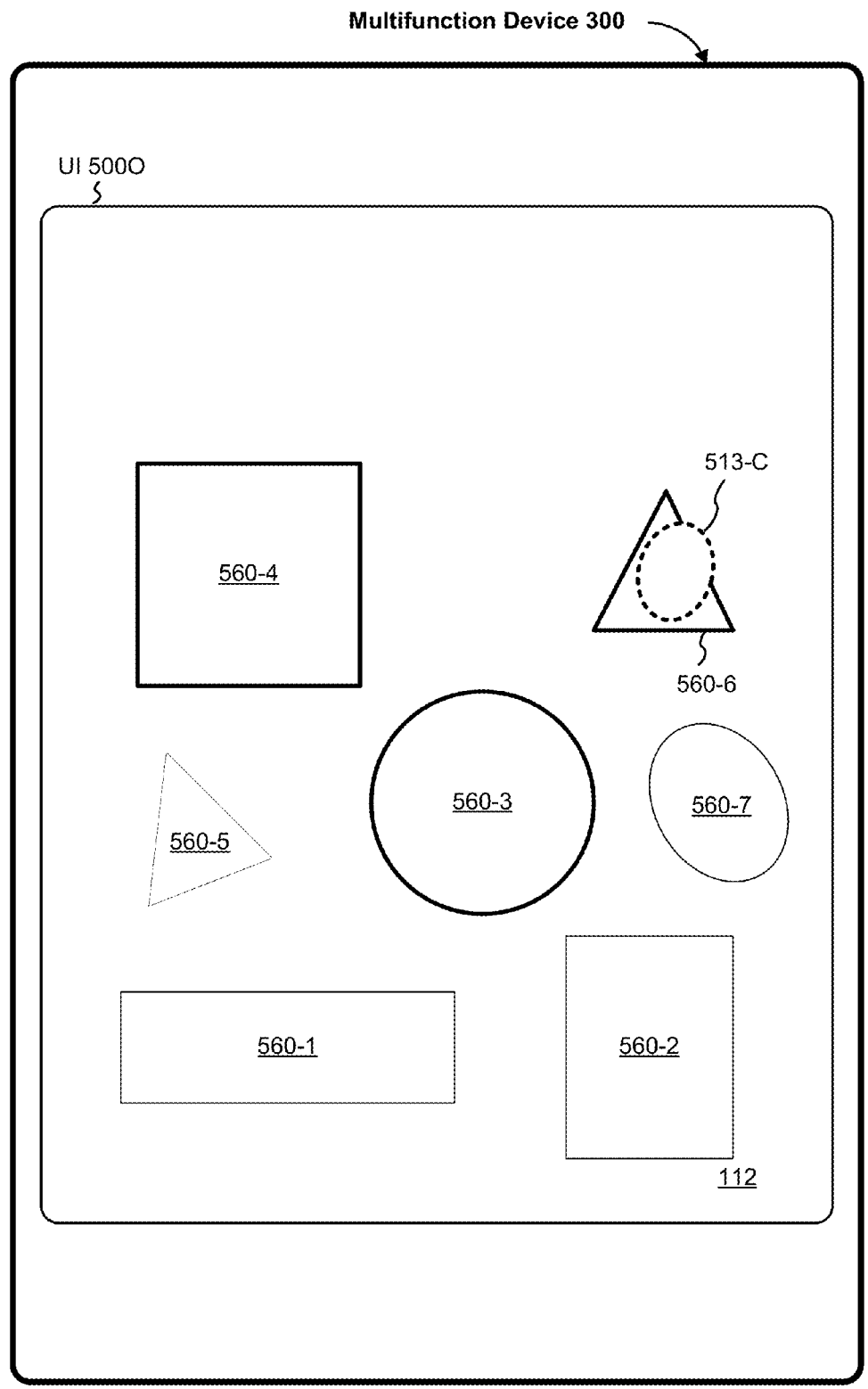
Figure 5P:
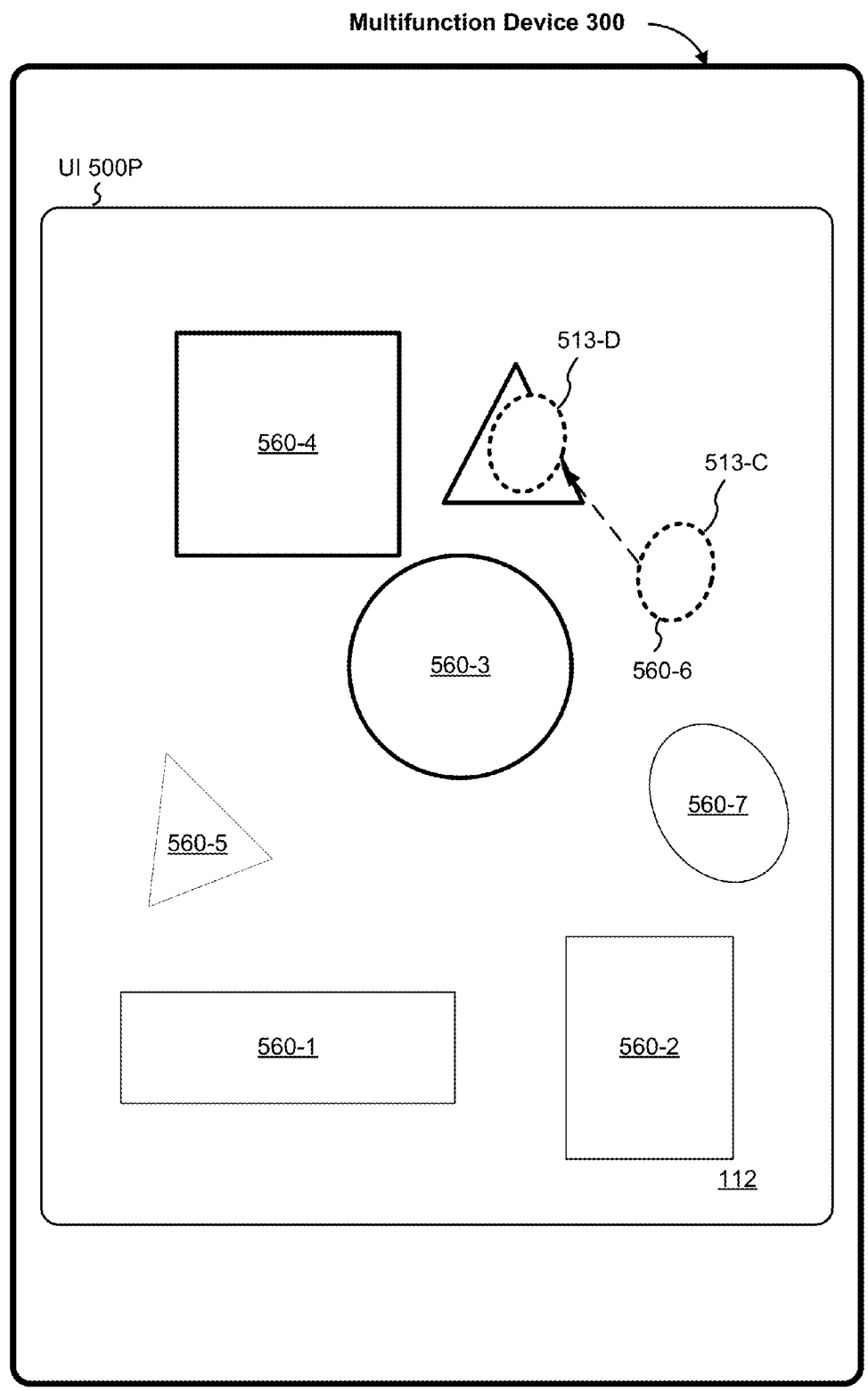

FIGS. 5A-5P illustrate exemplary user interfaces for manipulating chart portions or objects in accordance with some embodiments. The user interfaces in these figures are used to illustrate the processes described below, including the processes in FIGS. 6A-6B and 7.

In FIGS. 5A-5P, some finger contact movement sizes may be exaggerated for illustrative purposes. No depiction in the figures bearing on finger contact movements should be taken as a requirement or limitation for the purpose of understanding sizes and scale associated with the methods and devices disclosed herein.

FIGS. 5A-5L illustrate exemplary user interfaces for manipulating chart portions. UI 500A (FIG. 5A) depicts an exemplary user interface displaying a chart object 500-1 on touch screen 112. In this example, displayed chart object 500-1 is a pie chart. Displayed chart object 500-1 includes five chart portions (510, 512, 514, 516, 518), which are also referred to herein as pie slices or wedges.

UI 500A illustrates a contact at a location 505-A on touch screen 112 corresponding to the location of chart portion 510. For convenience, this contact is herein referred to as contact 505, even as it moves from location 505-A to other locations (e.g., location 505-B) on touch screen 112, as discussed below.

UI 500A also illustrates a detection of a tap 505-A' immediately prior to the detection of the contact 505 at location 505-A. In this example, tap 505-A' is at a location near the location 505-A of the contact 505. In this example, contact 505 (at location 505-A) and tap 505-A' are at locations on touch screen 112 corresponding to the location of the same chart portion 510.

In UI 500A, chart portion 510 is visually distinguished from the remainder of the chart portions (512, 514, 516, 518), as chart portion 510 has a thicker border than the remainder of the chart.

UI 500B (FIG. 5B) illustrates movement of contact 505 across touch screen 112 to the location of chart portion 512 (e.g., to either 505-B or 505-B'). During the movement, contact 505 remains in contact with touch screen 112. In this example, the movement of the contact follows an arc (e.g., from 505-A to 505-B) or, alternatively, a straight line (e.g., from 505-A to 505-B').

In this example, contact 505 during the movement touches respective locations on touch screen 112 of chart portions 510 and 512, thereby selecting chart portions 510 and 512.

UI 500B also illustrates that the selected chart portions (510, 512) are visually distinguished from the remainder of the chart portions of the chart object 500-1, as the selected chart portions (510, 512) have a thicker border than that for the remainder of the chart.

UI 500C (FIG. 5C) illustrates a continued movement of contact 505 across touch screen 112 to a location corresponding to chart portion 514. During the movement, contact 505 remains in contact with touch screen 112. In this example, the movement of the contact follows an arc (e.g., from 505-B to 505-C) or, alternatively, a straight line (e.g., from 505-B' to 505-C). In this example, contact 505 during the movement additionally touches a respective location on touch screen 112 of chart portion 514, thereby selecting chart portion 514 (i.e., with the detected movement of the contact to 505-C, the selected chart portions are chart portions 510, 512, and 514).

UI 500C also illustrates that the selected chart portions are visually distinguished from the remainder of the chart, as the selected chart portions 510, 512, and 514 have a thicker border than that for the remainder of the chart.

UI 500D (FIG. 5D) illustrates a pause in the movement of the contact at 505-D. During the pause, contact 505 remains in contact with touch screen 112.

UI 500E (FIG. 5E) illustrates movement of contact 505 across touch screen 112 from 505-D to 505-E. During the movement, contact 505 remains in contact with touch screen 112. In this example, the movement of the contact is in a direction away from the remainder of the chart (i.e., unselected chart portions 516 and 518)).

UI 500E also illustrates the movement of the selected chart portions (510, 512, 514) as a single unit in the direction away from the unselected chart portions (516, 518) in accordance with the movement of contact 505. In this example, the distance and direction of the movement of the selected chart portions (510, 512, 514) correspond to the distance and direction of the movement of the contact (e.g., from 505-D to 505-E).

UI 500E also includes a visual indicator 530 that indicates the movement of the selected chart portions relative to the remainder of the chart. In this example, visual indicator 530 indicates that the selected chart portions have moved to a location where the "explosion" is 45%. An explosion is a number used for a circular chart (e.g., a pie chart, a donut chart, etc.) to indicate the distance of selected chart portions from the center of the remaining circular chart. More specifically, the explosion is calculated by dividing the distance of exploded (i.e., moved) chart portions to the center of the remaining circular chart by the radius of the circular chart. An explosion of 100% indicates that the distance between the exploded chart portions and the center of the circular chart equals the radius of the circular chart. In this example, the 45% explosion indicates that the distance between the moved chart portions (510, 512, 514) and the center of the remaining pie chart 500-1 is 45% of the radius of the pie chart.

UI 500F (FIG. 5F) illustrates a detection of a second contact 511 at a location corresponding to the selected chart portions (510, 512, 514).

UI 500G (FIG. 5G) illustrates a movement of second contact 511 across touch screen 112 (e.g., from 511-A to 511-B). In this example, the second contact 511 moves towards the unselected chart portions (516, 518).

In UI 500G, the selected chart portions (510, 512, 514) are moved as a single unit in accordance with the movement of second contact 511. In this example, the distance and direction of the movement of the selected chart portions (510, 512, 514) correspond to the distance and direction of the movement of second contact 511.

UI 500G also illustrates that visual indicator 530 is updated during the movement of the selected chart portions (510, 512, 514). In this example, visual indicator 530 indicates an explosion of 18%, reflecting the distance between the selected chart portions (510, 512, 514) and the center of pie chart 500-1 as a percentage of the radius of pie chart 500-1.

UI 500H (FIG. 5H) illustrates the continued movement of the second contact 511-C across touch screen 112 toward the unselected chart portions (516, 518).

In UI 500H, the selected chart portions (510, 512, 514) are moved as a single unit in accordance with the movement of the second contact 511 until the selected chart portions (510, 512, 514) rejoin the unselected chart portions (516, 518).

In UI 500H, when the selected chart portions (510, 512, 514) touch the unselected chart portions (516, 518), visual indicator 530 shows that the explosion is 0%, indicating that the distance between the selected chart portions (510, 512, 514) and the center of the chart object 500-1 is zero.

UI 500I (FIG. 5I) illustrates movement of the first contact from 505-C to 505-I (prior to the pause at 505-D). In this example, this "reversal" in the direction of the first movement of the first contact 505 deselects chart portion 514. Accordingly, the visual indication for chart portion 514 (e.g., the thicker border) disappears, indicating that chart portion 514 is no longer selected.

UI 500J (FIG. 5J) depicts a two-finger depinch gesture made by a third contact 507 and a fourth contact 509 moving away from each other (e.g., from 507-A and 509-A in FIG. 5J to 507-B and 509-B in FIG. 5K, respectively). Alternative depinch gestures include moving only one of the contacts away from the other contact, while keeping the other contact in place (e.g., moving the third contact 507-A away from the fourth contact 509-A while keeping the fourth contact 509-A in place, or vice versa). In this example, the depinch movement is used to increase the size of the selected portions (510, 512, 514).

UI 500K (FIG. 5K) illustrates the result of detecting the depinch gesture. In this example, an enlargement of the selected portions is displayed on touch screen 112.

UI 500K also illustrates a magnification indicator 532, which shows the magnification ratio of the selected portions. In this example, the magnification indicator 532 indicates that the selected portions are enlarged by 110%.

UI 500L (FIG. 5L) illustrates the manipulation of another type of chart object. In this example, chart object 500-2 is a donut chart, and manipulation of chart object 500-2 (by a method analogous to what is described herein with reference to Figures 5A-5H) moves selected chart portions (e.g., 550, 552, and 554) as a single unit away from unselected chart portions (e.g., 556, and 558).

UI 500L also shows visual indicator 530, which indicates the explosion of the selected chart portions.

UI 500L also shows supplemental information indicator 534, which displays other information, such as the sum of the values of the selected chart portions. In this example, the sum of the values of the selected chart portions represents 62% of the entire chart.

FIGS. 5M-5P illustrate exemplary user interfaces for manipulating a collection of objects. UI 500M (FIG. 5M) depicts an exemplary user interface displaying a collection of objects 560 (e.g., 560-1, 560-2, 560-3, 560-4, 560-5, 560-6, and 560-7) on touch screen 112.

In UI 500N (FIG. 5N), a contact is detected at a location 513-A on touch screen 112 corresponding to object 560-4. For convenience, this contact is herein called contact 513, even as it moves to other locations on touch screen 112. UI 500N also illustrates that contact 513 moves across touch screen 112 to location 513-B that corresponds to object 560-6. During the movement, contact 513 remains in contact with touch screen 112. In some embodiments, contact 513 is considered to remain "in contact" with touch screen 112, so as to maintain an ongoing tough gesture, so long as the touch gesture is made by one or more fingers or one or more styluses that make physical contact with touch-sensitive screen 112 or that remain sufficiently close to touch-sensitive screen 112 that the one or more sensors of touch-sensitive screen 112 are able to continue to detect the touch gesture. During the movement, contact 513 touches object 560-3. After the movement of contact 513, objects 560-3, 560-4, and 560-6 are selected. In UI 500N, selected objects (560-3, 560-4, and 560-6) are visually distinguished from the remainder of the objects (560-1, 560-2, 560-5, and 560-7).

UI 500O (FIG. 5O) illustrates a pause in the movement of the contact at location 513-C on touch screen 112. During the pause, contact 513 remains in contact with touch screen 112.

UI 500P (FIG. 5P) illustrates movement of contact 513 across touch screen 112 from 513-C to 513-D. During the movement, contact 513 remains in contact with touch screen 112. UI 500P also illustrates the movement of the selected objects (560-3, 560-4, and 560-6) away from the unselected objects (560-1, 560-2, 560-5, and 560-7) in accordance with the movement of contact 513. In this example, the distance of the movement of the selected chart portions (560-3, 560-4, and 560-6) corresponds to the distance of the movement of the contact (e.g., from 513-C to 513-D). During the movement, the spacing between two selected objects (e.g., two of: 560-3, 560-4, and 560-6) changes in accordance to a predetermined rule. In this example, the spacing decreases with the movement of the selected chart portions (560-3, 560-4, and 560-6) from their previous locations. In some embodiments, the spacing can increase with the movement of selected chart portions from their previous locations. In some other embodiments, during the movement, the spacing between two selected objects (e.g., two of: 560-3, 560-4, and 560-6) remains unchanged.

It should be noted that although FIGS. 5A-5P illustrate exemplary user interfaces including a plurality of chart portions or graphical objects, the exemplary user interfaces can include other types of objects. In some embodiments, the objects comprise portions of a table, graph, diagram, and/or other visual representation of data.

Figure 6A:
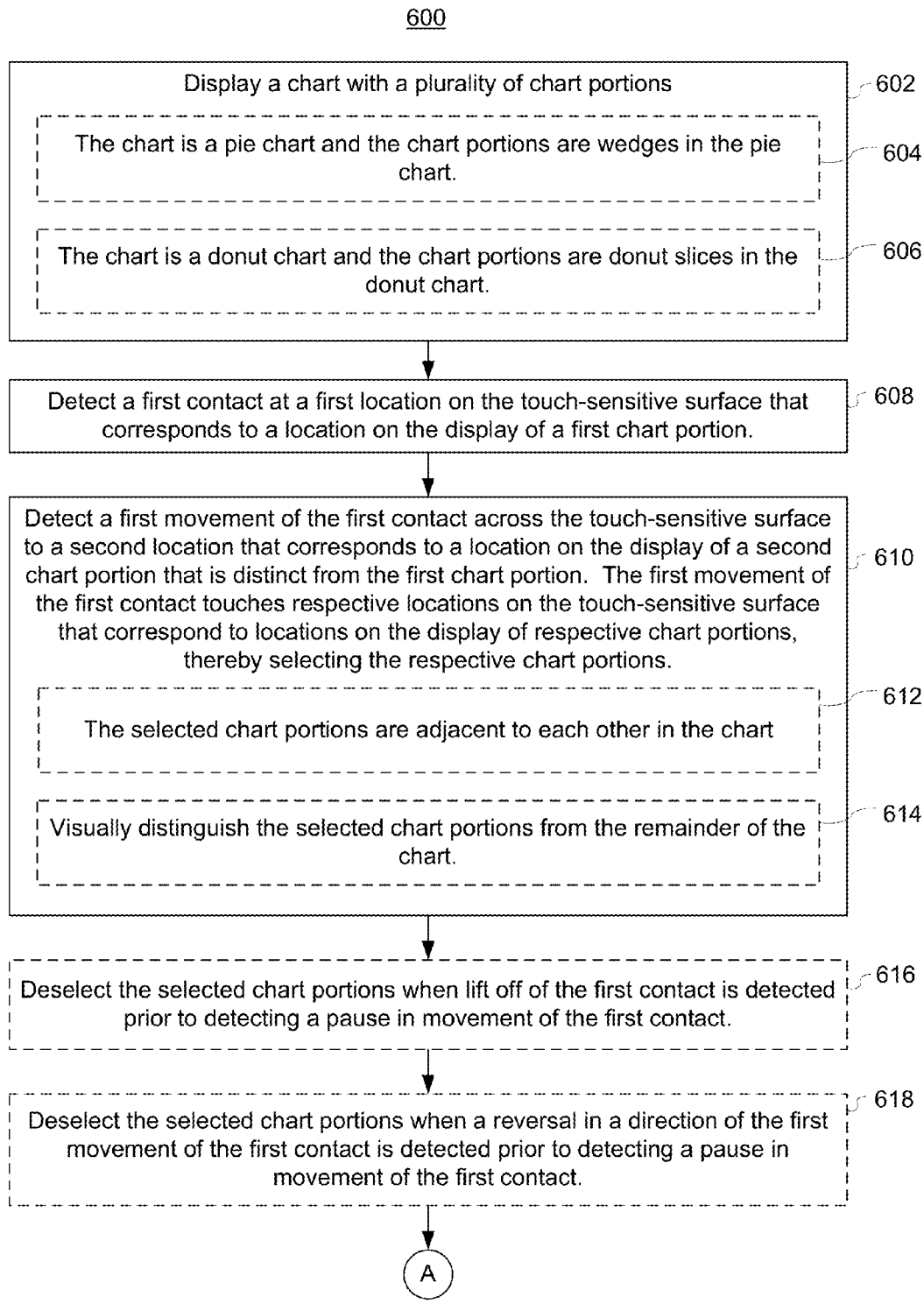
FIGS. 6A-6B are flow diagrams illustrating a method of manipulating portions of a chart in accordance with some embodiments.
Figure 6B:
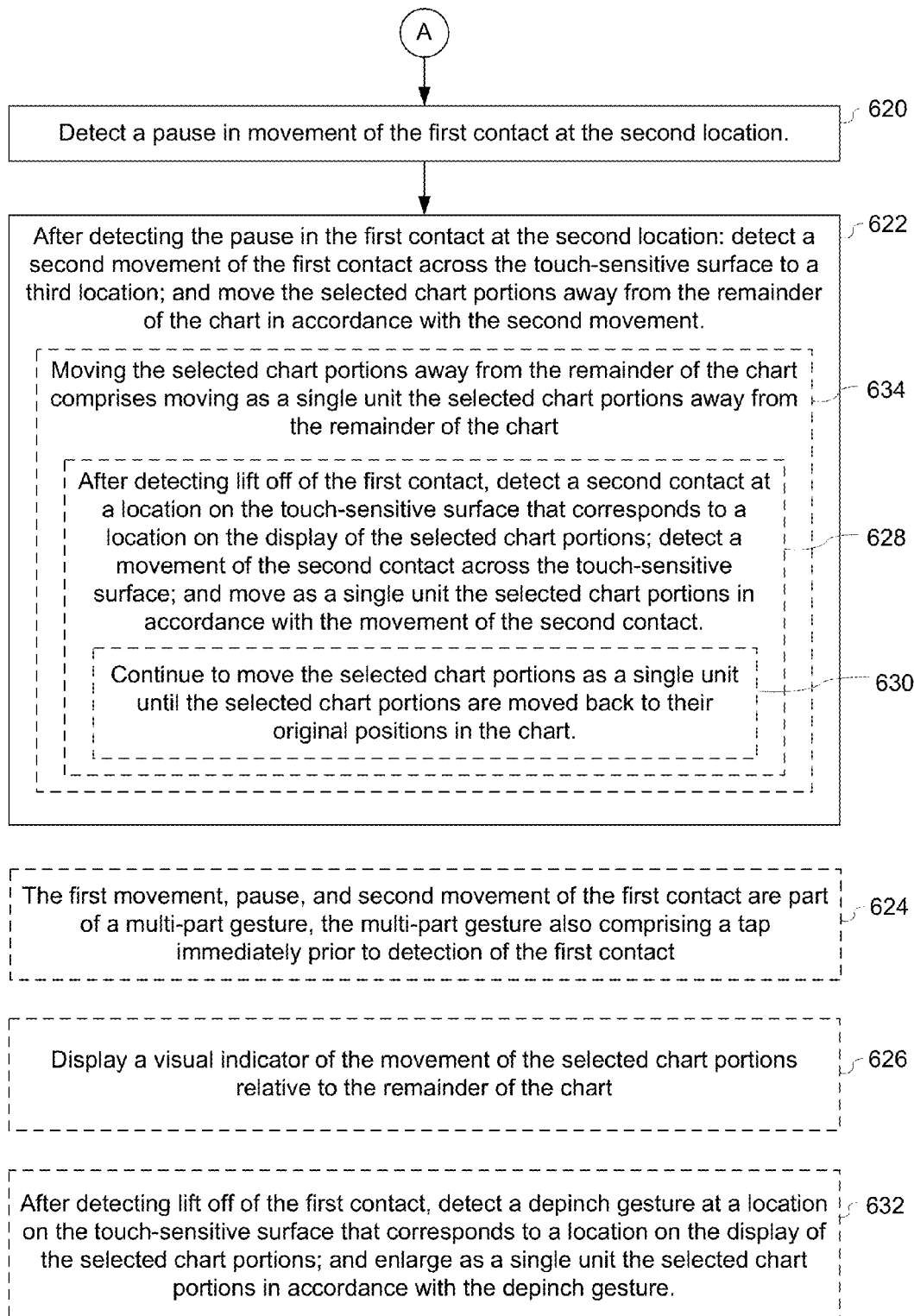

FIGS. 6A and 6B are flow diagrams illustrating a method 600 of manipulating portions of a chart in accordance with some embodiments. Method 600 is performed at a multifunction device (e.g., device 300, FIG. 3, or portable multifunction device 100, FIGS. 1A and 1B) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 provides an intuitive way to use gestural input for manipulating portions of a chart. The method reduces the cognitive burden on a user when the user manipulates a plurality of chart portions, thereby creating a more efficient human-machine interface. For battery-operated computing devices, enabling a user to manipulate a plurality of chart portions faster and more efficiently conserves power and increases the time between battery charges.

The device displays (602) a chart object with a plurality of chart portions. For example, in FIG. 5A, UI 500A includes a displayed chart object 500-1 with a plurality of chart portions (510, 512, 514, 516, and 518).

In some embodiments, the chart is a pie chart and the chart portions are wedges in the pie chart (604) (e.g., in FIG. 5A, UI 500A illustrates a pie chart 500-1 with a plurality of wedges (510, 512, 514, 516, 518)).

In some embodiments, the chart is a donut chart and the chart portions are donut slices in the donut chart (606) (e.g., in FIG. 5L, UI 500L illustrates a donut chart 500-2 with a plurality of donut slices (550, 552, 554, 556, 558)).

In some embodiments, the chart includes a table, graph, diagram, or other visual representation of data.

The device detects (608) a first contact at a first location on the touch-sensitive surface that corresponds to a location on the display of a first chart portion (e.g., in FIG. 5A, contact 505-A is detected at a first location on touch screen 112 that corresponds to chart portion 510). As described with reference to FIG. 2, the first contact can be a finger contact or a contact with a stylus.

The device detects (610) a first movement of the first contact across the touch-sensitive surface to a second location that corresponds to a location on the display of a second chart portion that is distinct from the first chart portion. For example, in FIG. 5C, contact 505 has moved from 505-A to 505-C, a second location on touch screen 112 that corresponds to chart portion 514. Chart portion 514 is distinct from chart portion 510. During the first movement of the first contact, the first contact touches respective locations on the touch-sensitive surface that correspond to locations on the display of respective chart portions (e.g., in FIGS. 5A-5C, contact 505 touches respective locations on the touch screen that correspond to chart portions 510, 512, and 514), thereby selecting the respective chart portions (e.g., in FIG. 5C, chart portions 510, 512, and 514 are selected).

In some embodiments, the selected chart portions are adjacent to each other in the chart (612) (e.g., chart portions 510, 512, and 514 are adjacent to each other in FIG. 5C).

In some embodiments, when the first movement is an arc or line that successively touches a series of adjacent chart portions, those adjacent chart portions are selected (e.g., as described above with respect to FIGS. 5A-5C).

In some embodiments, the selected chart portions are visually distinguished from the remainder of the chart (614) (e.g., in FIG. 5C, selected chart portions 510, 512, and 514 are visually distinguished from the remainder of the chart by a thicker borderline). Examples of visually distinguishing the selected chart portions include using a drop shadow on the selected chart portions, bolding the boundaries of the selected chart portions (e.g., changing the thickness of a borderline for the selected chart portions), changing the color of the selected chart portions, displaying a visual indicator next to or on the selected chart portions, or otherwise highlighting the selected chart portions.

In some embodiments, respective chart portions are highlighted as they are selected. For example, for a finger contact on a touch screen display, a chart portion becomes highlighted during the movement of the finger contact when the finger contact touches the respective chart portion. In some embodiments, the selected chart portions are highlighted when a pause in movement of the contact is detected (e.g., at 505-D in FIG. 5D). The highlighting indicates to a user that the selected chart portions have been grouped together and will subsequently be manipulated simultaneously.

In some embodiments, the selected chart portions are deselected when lift off of the first contact is detected prior to detecting a pause in movement of the first contact (616). For example, if contact 505 is lifted off prior to detecting the pause at 505-D (FIG. 5D), chart portions 510, 512, and 514 are deselected. The multi-part gesture may be cancelled in the middle of the gesture merely by lifting off the first contact prior to pausing the first contact.

In some embodiments, the selected chart portions are deselected when a reversal in a direction of the first movement of the first contact is detected prior to detecting a pause in movement of the first contact (618). In some embodiments, when the first movement is an arc or line that reverses direction (e.g., a clockwise arc movement changes to a counter-clockwise arc movement or a left-to-right movement changes to a right-to-left movement), then the first movement is not recognized as being part of a multi-part gesture and chart portions are either deselected or not selected.

In some other embodiments, the selected chart portions remain selected even when a reversal in a direction of the first movement of the first contact is detected prior to detecting a pause in movement of the first contact. But the selected chart portions are deselected when lift-off of the first contact is detected prior to detecting a pause.

In yet other embodiments, at least a subset of the selected chart portions are deselected when a reversal in a direction of the first movement of the first contact is detected prior to detecting a pause in movement of the first contact. For example, in FIG. 5I, portion 514 is deselected when the contact moves from 505-C to 505-I.

The device detects (620) a pause in movement of the first contact at the second location (e.g., in FIG. 5D, contact 505-D remains at the same location during the pause). In some embodiments, detecting the pause includes determining that the movement of the first contact is less than a predefined amount for at least a predefined time. In some embodiments, the predefined amount is an eighth to a quarter of an inch across the touch-sensitive surface, and the predefined time is 0.2-0.5 seconds. In other embodiments, detecting the pause includes determining that the first contact remains within an area corresponding to the area on the display of a single chart portion for at least a predefined time.

After detecting the pause in the first contact at the second location, the device detects (622) a second movement of the first contact across the touch-sensitive surface to a third location and moves the selected chart portions away from the remainder of the chart in accordance with the second movement. For example, in FIG. 5E, contact 505 moves across the touch screen from 505-D to a third location 505-E and the selected chart portions 510, 512, and 514 are moved away from the remainder of the chart in accordance with the movement of contact 505.

In some embodiments, moving the selected chart portions (e.g., 510, 512, and 514) away from the remainder of the chart comprises moving as a single unit the selected chart portions away from the remainder of the chart (634). In some embodiments, moving the selected chart portions as a single unit preserves the relative positions of the selected chart portions. For example, in FIG. 5E, the selected chart portions 510, 512, and 514 are moved as a single unit away from the remainder of the chart in accordance with the movement of contact 505. In some embodiments, moving the selected chart portions as a single unit includes maintaining the selected chart portions in contact with one another.

In some embodiments, after detecting lift off of the first contact, the device detects a second contact (e.g., a finger contact or a stylus contact) at a location on the touch-sensitive surface that corresponds to a location on the display of the selected chart portions; detects a movement of the second contact across the touch-sensitive surface; and moves as a single unit the selected chart portions in accordance with the movement of the second contact (628). For example, in FIG. 5F, a second contact 511 is detected at a location on touch screen 112 that corresponds to the location of the selected chart portions 510, 512, and 514. FIG. 5G illustrates movement of second contact 511 across touch screen 112 from 511-A to 511-B. In FIG. 5G, the selected chart portions 510, 512, 514 are moved as a single unit in accordance with the movement of second contact 511.

In some embodiments, the device continues to move the selected chart portions as a single unit until the selected chart portions are moved back to their original positions in the chart (630). In some embodiments, the selected chart portions continue to be manipulated as a single unit/group until the group is moved back to its original position in the chart. For example, in FIGS. 5E-5G, selected wedges 510, 512, and 514 of pie chart 500-1 move as a single unit. In FIG. 5H, selected wedges 510, 512, and 514 have been moved back into their original positions in pie chart 500-1. Once the selected wedges (e.g., 510, 512, and 514) have been moved back into their original positions in the chart (e.g., 500-1), these wedges can once again be manipulated individually, and are no longer treated as a single unit/group.

In some embodiments, the first movement, pause, and second movement of the first contact are part of a multi-part gesture. In some embodiments, the multi-part gesture also includes a tap (e.g., at or near the first location) immediately prior to detection of the first contact (624)(e.g., in FIG. 5A, a tap 505-A' near the location of contact 505-A). The tap is detected within a predefined time period prior to detection of the first contact (e.g., 0.1-0.5 seconds). The multi-part-gesture may also comprise lift-off of the first contact after the second movement, which indicates the end of the multi-part gesture.

In some embodiments, the device displays a visual indicator of the movement of the selected chart portions relative to the remainder of the chart (626). For example, in FIGS. 5E-5H, when moving a selected group of wedges in a pie chart, indicator 530 shows the movement relative to the center of the pie chart (e.g., explosion). 0% indicates that the selected group of wedges has not moved from the center; 50% indicates that the selected group of wedges has moved from the center by a distance equal to one half the radius of the pie chart; 100% indicates that the selected group of wedges has moved from the center by a distance equal to the radius of the pie chart; and so on.

In some embodiments, after detecting lift off of the first contact, the device detects a depinch gesture (e.g., a two-finger depinch gesture) at a location on the touch-sensitive surface that corresponds to a location on the display of the selected chart portions and enlarges as a single unit the selected chart portions in accordance with the depinch gesture (632) (e.g., as described above with reference to FIGS. 5J and 5K).

Figure 7:
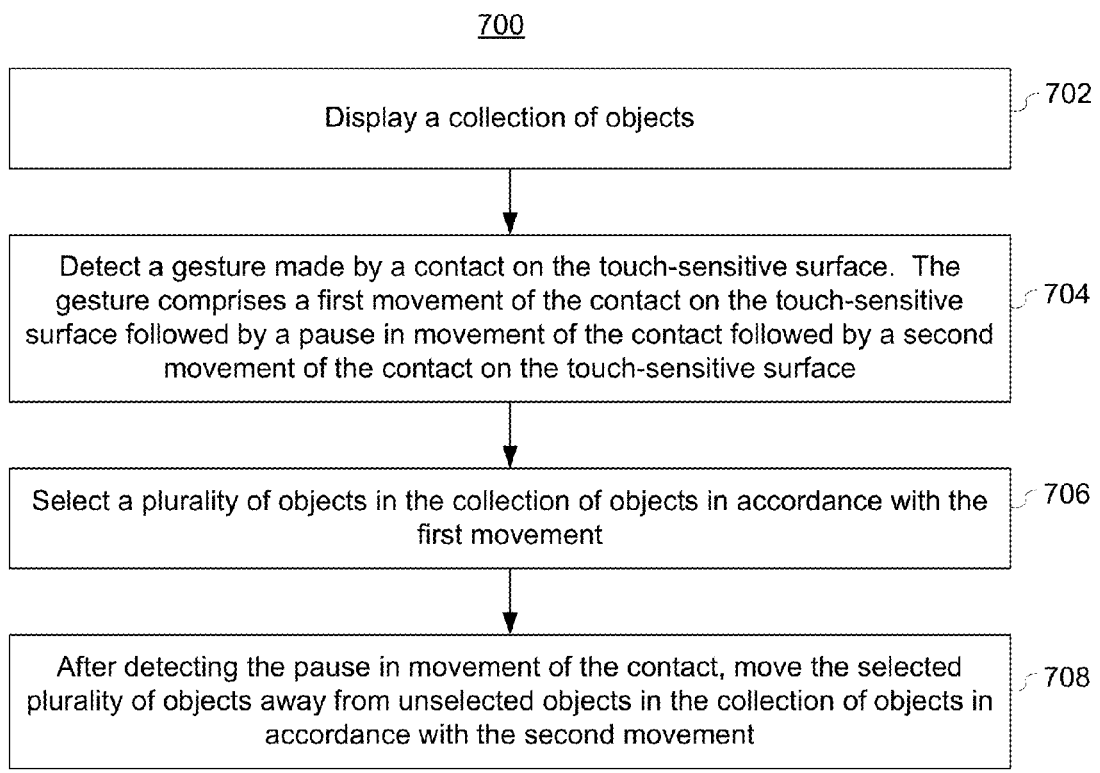
FIG. 7 is a flow diagram illustrating a method of manipulating a collection of objects in accordance with some embodiments.

FIG. 7 is a flow diagram illustrating a method 700 of manipulating a collection of objects in accordance with some embodiments. Method 700 is performed at a multifunction device (e.g., device 300, FIG. 3, or portable multifunction device 100, FIGS. 1A and 1B) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, method 700 provides an intuitive way to use gestural input for manipulating a collection of objects. The method reduces the cognitive burden on a user when the user manipulates a collection of objects, thereby creating a more efficient human-machine interface. For battery-operated computing devices, enabling a user to manipulate a collection of objects faster and more efficiently conserves power and increases the time between battery charges.

Optionally, manipulation of a collection of objects described with reference to FIG. 7 has one or more of the characteristics of manipulation of a plurality of chart portions described above with reference to method 600 (e.g., FIGS. 6A-6B) and FIGS. 5A-5P. For brevity, these details are not repeated below.

The device displays a collection of objects (702). In some embodiments, the objects are related to each other, such as portions of a chart (e.g., FIGS. 5A-5L). In other embodiments, the objects are independent of each other (e.g., FIGS. 5M-5P).

The device detects a gesture made by a contact on the touch-sensitive surface (704). The gesture comprises a first movement of the contact on the touch-sensitive surface followed by a pause in movement of the contact followed by a second movement of the contact on the touch-sensitive surface (e.g., FIGS. 5N-5O; also see another example in FIGS. 5A-5D as described above).

The device selects (706) a plurality of objects in the collection of objects in accordance with the first movement (e.g., FIGS. 5N-5O; also see another example in FIGS. 5A-5D as described above). In some embodiments, the device selects a plurality of objects in the collection of objects that the contact touches during the first movement. In some other embodiments, the device selects a plurality of objects that are located within a proximity of the contact (e.g., the device determines whether respective objects are located within a predefined distance threshold from the contact) during the first movement.

After detecting the pause in movement of the contact, the device moves (708) the selected plurality of objects away from unselected objects in the collection of objects in accordance with the second movement (e.g., FIG. 5P; also see another example in FIG. 5E as described above).

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 6A, 6B, and 7 may be implemented by components depicted in FIGS. 1A-1C. For example, detection operations 608, 610, and 620, and detect and move operation 622 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface. When a respective predefined event or sub-event is detected, event recognizer 180 activates an event handler 180 associated with the detection of the event or sub-event. Event handler 180 may utilize or call data updater 176 or object updater 177 to update the internal state of application 136-1 data. In some embodiments, event handler 180 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A multifunction device, comprising:
a display;
a touch-sensitive surface;
one or more processors;
memory; and
one or more programs, wherein the one or more programs are stored in the memory and configured to be executed by the one or more processors, the one or more programs including instructions for:
displaying a chart with a plurality of chart portions;
detecting a first single finger contact at a first location on the touch-sensitive surface that corresponds to a location on the display of a first chart portion;
detecting a first movement of the first single finger contact across the touch-sensitive surface to a second location that corresponds to a location on the display of a second chart portion that is distinct from the first chart portion, wherein the first movement of the first single finger contact touches respective locations on the touch-sensitive surface that correspond to locations on the display of respective chart portions, thereby selecting the respective chart portions;
detecting a pause in movement of the first single finger contact at the second location; and,
after detecting the pause in movement of the first single finger contact at the second location:
detecting a second movement of the first single finger contact across the touch-sensitive surface to a third location; and
moving the selected chart portions away from the remainder of the chart in accordance with the second movement;
wherein the first single finger contact maintains contact with the touch-sensitive surface throughout the first movement, the pause, and the second movement.

2. The device of claim 1, wherein the first movement, pause, and second movement of the first single finger contact are part of a multi-part gesture, the multi-part gesture also comprising a tap immediately prior to detection of the first single finger contact.

3. The device of claim 1, further comprising instructions for displaying a visual indicator of the movement of the selected chart portions relative to the remainder of the chart.

4. The device of claim 1, further comprising instructions for:
deselecting the selected chart portions when lift off of the first single finger contact is detected prior to detecting the pause in movement of the first single finger contact.

5. The device of claim 1, wherein moving the selected chart portions away from the remainder of the chart comprises moving as a single unit the selected chart portions away from the remainder of the chart, the device further comprising instructions for:
after detecting lift off of the first single finger contact, detecting a second contact at a location on the touch-sensitive surface that corresponds to a location on the display of the selected chart portions;
detecting a movement of the second contact across the touch-sensitive surface; and
moving as a single unit the selected chart portions in accordance with the movement of the second contact.

6. The device of claim 1, further comprising instructions for:
after detecting lift off of the first single finger contact, detecting a depinch gesture at a location on the touch-sensitive surface that corresponds to a location on the display of the selected chart portions; and
enlarging as a single unit the selected chart portions in accordance with the depinch gesture.

7. A method, comprising:
at a multifunction device with a display and a touch-sensitive surface:
displaying a chart with a plurality of chart portions;
detecting a first single finger contact at a first location on the touch-sensitive surface that corresponds to a location on the display of a first chart portion;
detecting a first movement of the first single finger contact across the touch-sensitive surface to a second location that corresponds to a location on the display of a second chart portion that is distinct from the first chart portion, wherein the first movement of the first single finger contact touches respective locations on the touch-sensitive surface that correspond to locations on the display of respective chart portions, thereby selecting the respective chart portions;

detecting a pause in movement of the first single finger contact at the second location; and, after detecting the pause in movement of the first single finger contact at the second location:

detecting a second movement of the first single finger contact across the touch-sensitive surface to a third location; and moving the selected chart portions away from the remainder of the chart in accordance with the second movement;

wherein the first single finger contact maintains contact with the touch-sensitive surface throughout the first movement, the pause, and the second movement.

8. A non-transitory computer readable storage medium storing one or more programs, the one or more programs comprising instructions, which when executed by a multifunction device with a display and a touch-sensitive surface, cause the device to:

display a chart with a plurality of chart portions;

detect a first single finger contact at a first location on the touch-sensitive surface that corresponds to a location on the display of a first chart portion;

detect a first movement of the first single finger contact across the touch-sensitive surface to a second location that corresponds to a location on the display of a second chart portion that is distinct from the first chart portion, wherein the first movement of the first single finger contact touches respective locations on the touch-sensitive surface that correspond to locations on the display of respective chart portions, thereby selecting the respective chart portions;

detect a pause in movement of the first single finger contact at the second location; and, after detecting the pause in movement of the first single finger contact at the second location:

detect a second movement of the first single finger contact across the touch-sensitive surface to a third location; and move the selected chart portions away from the remainder of the chart in accordance with the second movement;

wherein the first single finger contact maintains contact with the touch-sensitive surface throughout the first movement, the pause, and the second movement.

9. A multifunction device, comprising:

a display;

a touch-sensitive surface;

one or more processors;

memory; and one or more programs, wherein the one or more programs are stored in the memory and configured to be executed by the one or more processors, the one or more programs including instructions for:

displaying a collection of objects;

detecting a gesture made by a single finger contact on the touch-sensitive surface, the gesture comprising a first movement of the single finger contact on the touch-sensitive surface followed by a pause in movement of the single finger contact followed by a second movement of the single finger contact on the touch-sensitive surface, wherein the single finger contact maintains contact with the touch-sensitive surface throughout the first movement, the pause, and the second movement;

selecting a plurality of objects in the collection of objects in accordance with the first movement; and, after detecting the pause in movement of the single finger contact, moving the selected plurality of objects away from unselected objects in the collection of objects in accordance with the second movement.

10. A method, comprising:

at a multifunction device with a display and a touch-sensitive surface:

displaying a collection of objects;

detecting a gesture made by a single finger contact on the touch-sensitive surface, the gesture comprising a first movement of the single finger contact on the touch-sensitive surface followed by a pause in movement of the single finger contact followed by a second movement of the single finger contact on the touch-sensitive surface, wherein the single finger contact maintains contact with the touch-sensitive surface throughout the first movement, the pause, and the second movement;

selecting a plurality of objects in the collection of objects in accordance with the first movement; and, after detecting the pause in movement of the single finger contact, moving the selected plurality of objects away from unselected objects in the collection of objects in accordance with the second movement.

11. A non-transitory computer readable storage medium storing one or more programs, the one or more programs comprising instructions, which when executed by a multifunction device with a display and a touch-sensitive surface, cause the device to:

display a collection of objects;

detect a gesture made by a single finger contact on the touch-sensitive surface, the gesture comprising a first movement of the single finger contact on the touch-sensitive surface followed by a pause in movement of the single finger contact followed by a second movement of the single finger contact on the touch-sensitive surface, wherein the single finger contact maintains contact with the touch-sensitive surface throughout the first movement, the pause, and the second movement;

select a plurality of objects in the collection of objects in accordance with the first movement; and, after detecting the pause in movement of the single finger contact, move the selected plurality of objects away from unselected objects in the collection of objects in accordance with the second movement.

12. The method of claim 7, wherein the first movement, pause, and second movement of the first single finger contact are part of a multi-part gesture, the multi-part gesture also comprising a tap immediately prior to detection of the first single finger contact.

13. The method of claim 7, including displaying a visual indicator of the movement of the selected chart portions relative to the remainder of the chart.

14. The method of claim 7, including deselecting the selected chart portions when lift off of the first single finger contact is detected prior to detecting the pause in movement of the first single finger contact.

15. The method of claim 7, wherein moving the selected chart portions away from the remainder of the chart comprises moving as a single unit the selected chart portions away from the remainder of the chart, the method including:

after detecting lift off of the first single finger contact, detecting a second contact at a location on the touch-sensitive surface that corresponds to a location on the display of the selected chart portions;

detecting a movement of the second contact across the touch-sensitive surface; and moving as a single unit the selected chart portions in accordance with the movement of the second contact.

16. The method of claim 7, including:
   after detecting lift off of the first single finger contact, detecting a depinch gesture at a location on the touch-sensitive surface that corresponds to a location on the display of the selected chart portions; and
   enlarging as a single unit the selected chart portions in accordance with the depinch gesture.

17. The non-transitory computer readable storage medium of claim 8, wherein the first movement, pause, and second movement of the first single finger contact are part of a multi-part gesture, the multi-part gesture also comprising a tap immediately prior to detection of the first single finger contact.

18. The non-transitory computer readable storage medium of claim 8, including instructions, which when executed by the multifunction device with the display and the touch-sensitive surface, cause the device to display a visual indicator of the movement of the selected chart portions relative to the remainder of the chart.

19. The non-transitory computer readable storage medium of claim 8, including instructions, which when executed by the multifunction device with the display and the touch-sensitive surface, cause the device to deselect the selected chart portions when lift off of the first single finger contact is detected prior to detecting the pause in movement of the first single finger contact.

20. The non-transitory computer readable storage medium of claim 8, wherein moving the selected chart portions away from the remainder of the chart comprises moving as a single unit the selected chart portions away from the remainder of the chart, the computer readable storage medium including instructions, which when executed by the multifunction device with the display and the touch-sensitive surface, cause the device to:
   after detecting lift off of the first single finger contact, detect a second contact at a location on the touch-sensitive surface that corresponds to a location on the display of the selected chart portions;
   detect a movement of the second contact across the touch-sensitive surface; and
   move as a single unit the selected chart portions in accordance with the movement of the second contact.

21. The non-transitory computer readable storage medium of claim 8, including instructions, which when executed by the multifunction device with the display and the touch-sensitive surface, cause the device to:
   after detecting lift off of the first single finger contact, detect a depinch gesture at a location on the touch-sensitive surface that corresponds to a location on the display of the selected chart portions; and
   enlarge as a single unit the selected chart portions in accordance with the depinch gesture.

* * * * *